(12) United States Patent
Fazzina et al.

(10) Patent No.: US 6,942,767 B1
(45) Date of Patent: Sep. 13, 2005

(54) CHEMICAL REACTOR SYSTEM

(75) Inventors: David Fazzina, Littleton, CO (US);
Jack Matthews, Littleton, CO (US);
Steve Taracevicz, Santa Monica, CA (US)

(73) Assignee: T-Graphic, LLC, Littleton, CO (US)

( * ) Notice: Subject to any disclaimer, the term of this patent is extended or adjusted under 35 U.S.C. 154(b) by 252 days.

(21) Appl. No.: 10/269,953

(22) Filed: Oct. 11, 2002

Related U.S. Application Data

(60) Provisional application No. 60/329,257, filed on Oct. 12, 2001.

(51) Int. Cl.[7] .......................... C25D 7/00; C25D 17/00; C25B 11/00
(52) U.S. Cl. ...................... 204/252; 204/242; 204/260; 204/263; 204/280; 204/284; 205/357; 205/788
(58) Field of Search ................................. 204/260, 263, 204/265, 266, 275.1, 252; 205/334, 788

(56) References Cited

U.S. PATENT DOCUMENTS

| | | | | |
|---|---|---|---|---|
| 2,741,595 A | * | 4/1956 | Juda ........................... | 204/633 |
| 3,936,363 A | * | 2/1976 | Fesseden .................... | 205/338 |
| 4,441,823 A | | 4/1984 | Power | |
| 4,675,254 A | * | 6/1987 | Shuster et al. ................ | 429/51 |
| 5,515,684 A | | 5/1996 | Lucas et al. | |
| 5,938,333 A | | 8/1999 | Kearney | |
| 5,985,110 A | | 11/1999 | Bakhir et al. | |
| 5,997,717 A | | 12/1999 | Miyashita et al. | |
| 6,004,257 A | | 12/1999 | Jacobson | |
| 6,258,222 B1 | | 7/2001 | Nakamura et al. | |
| 6,280,594 B1 | | 8/2001 | Yamaoka | |
| 6,332,968 B1 | | 12/2001 | Mazanec et al. | |
| 6,426,066 B1 | | 7/2002 | Najafi et al. | |

OTHER PUBLICATIONS

Fractal Control of Fluid Dynamics [online]. [Retrieved on Oct. 3, 2002] Retrieved from the Internet: <URL: http://www.arifractal.com/ar00001.htm. pp. 1-2.

Adrian Cho, "A Fresh Take on Disorder, Or Disorderly Science?" SCIENCE, Aug. 23, 2002; vol. 297, pp. 1268-1269.

Grzybowski et al., "Dynamic Aggregation of Chiral Spinners", SCIENCE, Apr. 26, 2002; vol. 296, pp. 718-721.

"Functional Electrolytic Water For Improved Milk Production in Dairy Cattle and for developing a healthy herd", Sales Brochure, Proton Laboratories, © 2001. pp. 1-23.

Edward E. Alexander, "seed germination plant health plant sustenance increased yield through the aqua dynamics of: Functional Electrolyzed Water as an: e-lectron donor, e-lectron scavenger", Sales Brochure, Proton Laboratories © 2001, pp. 1-20.

"Elementary Structures of Matter", pp. 1-11.

* cited by examiner

*Primary Examiner*—Roy King
*Assistant Examiner*—Lois Zheng
(74) *Attorney, Agent, or Firm*—Blakely, Sokoloff, Taylor & Zafman LLP

(57) ABSTRACT

A reactor comprising an inlet, an outlet, and a conically spiraling fluid flow channel coupled between the inlet and the outlet. The reactor may be an electrochemical reactor comprising a fluid flow channel that spirals about an axis, the fluid flow channel comprising an anode, a cathode across from the anode, and a membrane disposed between the anode and the cathode. The reactor may have a number of design parameters that are based upon one or more reaction species and that favor the occurrence of a reaction associated with the species. The reactor may be used for the electrolysis of water or for the production of other chemical products.

25 Claims, 29 Drawing Sheets

US 6,942,767 B1

CHEMICAL REACTOR SYSTEM

RELATED APPLICATIONS

The present application claims priority to and fully incorporates herein, U.S. Provisional Patent Application Ser. No. 60/329,257, entitled "Dynamic Fluid Reactor System", filed on Oct. 12, 2001.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software and data as described below and in the drawings hereto: Copyright © 2001, T-Graphic LLC, All Rights Reserved.

BACKGROUND OF THE INVENTION

1. Field of the Invention

Embodiments of the invention relate to extending the capabilities of reaction systems. In particular, embodiments of the invention relate to electrochemical reactors having designs that favor the occurrence of a reaction of interest.

2. Background Information

Electrolyzers are electrochemical reactors that are used for producing electrolyzed water. Various electrolyzers, their properties, and their uses are known in the arts. Several examples are provided below.

U.S. Pat. No. 5,985,110, issued Nov. 16, 1999, to Bakhir et al., discloses an apparatus for electrochemical treatment of water and/or water solutions, for regulation of acid-alkaline properties, Red-Ox characteristics and catalytic activity of water that can be used for obtaining washing and disinfecting solutions. The apparatus includes at least one electrochemical cell which contain vertical coaxial cylindrical and rod electrodes made from material nonsoluble during electrolysis and an ultrafiltration ceramic diaphragm installed between the electrodes to create inter-electrode space in the electrode chambers. Channels for the treated solution supply into and discharge from the electrode chambers. A feeding line is connected to the inlet of the negative electrode chamber and the output of the negative electrode chamber is connected to the inlet of the positive electrode chamber by a special line which has a by-pass for discharging a part of the degasified treated solution from the chamber of the negative electrode. A catalyst chamber can be installed on the special line. The catalyst chamber contains a mixture of particles of carbon and manganese dioxide. A separator with a tangential inlet is used for discharging a part of the degasified processed solution.

U.S. Pat. No. 5,997,717, issued Dec. 7, 1999, to Miashita et al., discloses electrolyzed functional water, and production process and production apparatus thereof. Electrolyzed functional water is produced by the process comprising a step of feeding water containing electrolytes to a first electrolytic cell equipped with an anode, a cathode and an ion-permeable membrane between them to electrolyze it, and a step of electrolyzing the electrolyzed water obtained from the cathodic side of the first electrolytic cell on the anodic side of a second electrolytic cell equipped with an anode, a cathode and an ion-permeable membrane between them. Production processes and production apparatus of the electrolyzed functional water are also disclosed.

U.S. Pat. No. 6,258,222, issued Jul. 10, 2001, to Nakamura et al., discloses an electrolyzer. An electrolyzer for electrolyzing water existing between electrode plates disposed at a prescribed interval by imposing a voltage between the electrode plates is arranged such that at least the electrode plate acting as an anode comprises a ferrite electrode including at least one hole is formed therein, the interval between the hole and an extreme or terminal end of an electrode terminal inserted into the hole is filled with a conductive metal coupling member that becomes deformed when the electrode terminal is inserted in the hole so that the ferrite electrode is made conductive to and arranged integrally with the electrode terminal. Accordingly, in the electrolyzer, the coupling resistance between the electrode terminal and the electrode plate is reduced as well as a large processing current can be flowed to the electrolyzer for a long time even under conditions of low conductivity in which water having low conductivity is used, or the amount of an electrolyte required or necessary to be added to the water is reduced or minimized to some extent.

BRIEF DESCRIPTION OF THE SEVERAL VIEWS OF THE DRAWINGS

The novel features believed characteristic of the invention are set forth in the appended claims. The present invention is illustrated by way of example, and not by way of limitation, in the figures of the accompanying drawings and in which like reference numerals refer to similar elements. The invention itself, however, as well as a preferred mode of use, will best be understood by reference to the following detailed description of an illustrative embodiment when read in conjunction with the accompanying drawings:

DETAILED DESCRIPTION OF THE INVENTION

In the following description, for the purpose of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

One of the problems with the prior art electrolyzers, and with reactors in general, is limited control over the reactions carried out therein. The design of the reactor often does not take into consideration the characteristics of the reaction, the reactants, or the products. The present inventors have discovered new and useful reactors with flexible designs that allow improved control over reactions based on physicochemical characteristics of one or more molecules involved in the reactions. The reactors may exploit and fully appreciate the physicochemical differences between reactants and products of a particular reaction in order to control the reaction. The reactors may have designs that thermodynamically favor formation of products. This may allow improved conversion of reactants to products, improved production of chemical products, increased manufacturing yields, and increased profitability.

Figure 1:
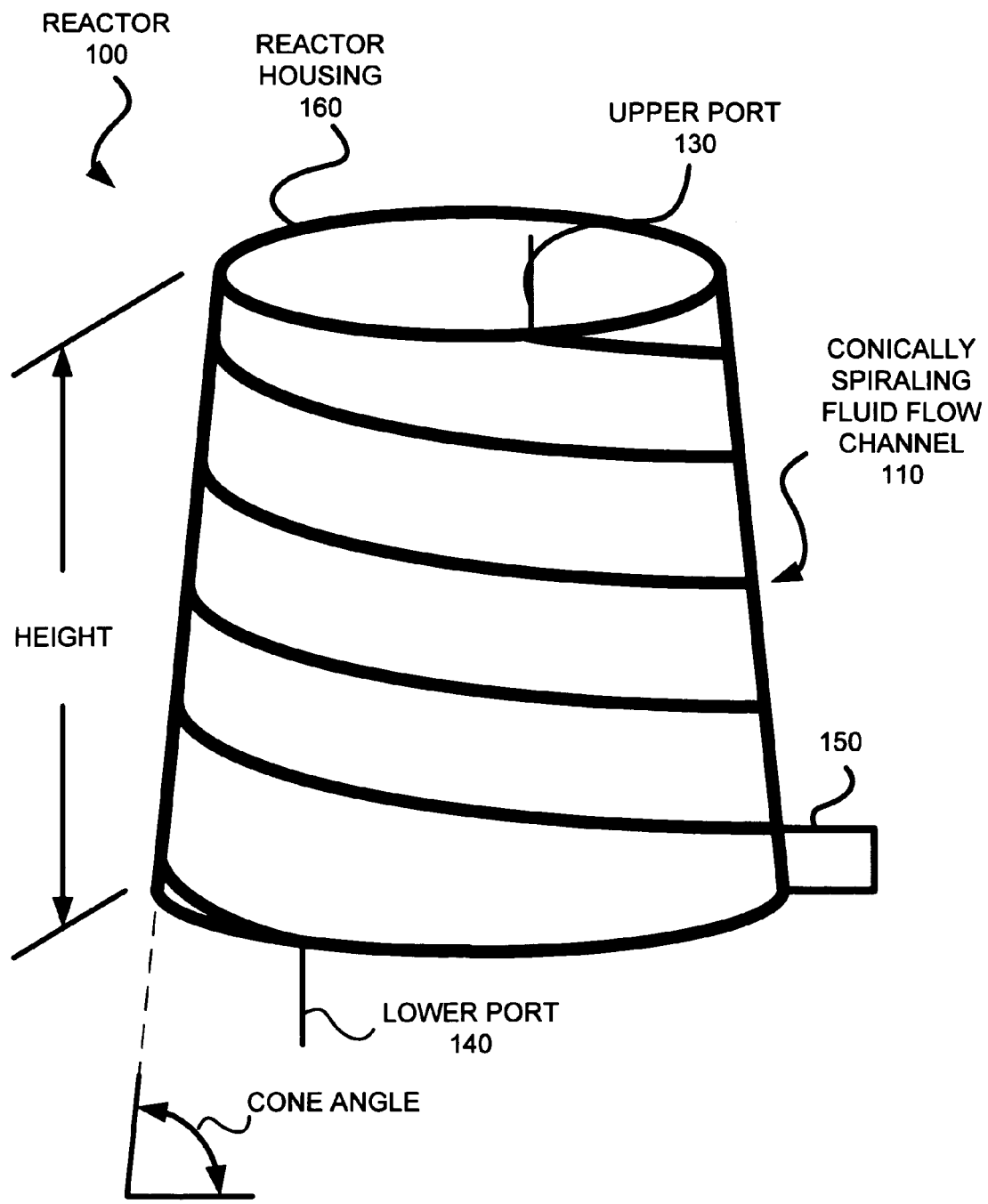
FIG. 1 shows a novel and useful reactor comprising an inlet, an outlet, and a conically spiraling fluid flow channel coupled between the inlet and the outlet, according to embodiments of the invention.

FIG. 1 shows a novel and useful reactor 100 comprising an inlet, an outlet, and a conically spiraling fluid flow channel coupled between the inlet and the outlet, according to embodiments of the invention. The reactor contains a housing 160 containing a conically spiraling fluid flow channel 110 having an upper port 130 and a lower port 140. The geometry (e.g., size and shape) of a reactor may be determined based on one or more molecules in order to favor a particular reaction of interest. The reactor also contains a waveform energy input device (e.g., a sonic energy input device, an electromagnetic energy input device, a laser, etc.) that may be used to provide energy to influence a reaction within the reactor. The waveform energy input device may also be designed based on one or more molecules in order to favor a particular reaction of interest. The following detailed description discloses determining parameters of the reactor in order to influence the reaction. The parameters may be determined for a particular reaction, or for one or more molecules associated with the reaction.

The reactor has a number of design parameters that may be determined, for a particular reaction, in order to achieve good kinetics and thermodynamics of reaction. According to embodiments of the invention the reactor or one or more design parameters thereof may be determined based on Le Chatelier's Principle. This principle states that a system at equilibrium, or striving to attain equilibrium, may respond in such a way as to counteract a stress placed upon it. If a stress or change in conditions is applied to a system at equilibrium, the system may shift in the direction that reduces the stress. The present inventors contemplate employing reactors that stress reactants at a reactor inlet and/or that reduce stress to products at a reactor outlet in order to shift an extent of a reaction in which reactants are reactively converted to products. The free energy of a fluid may be altered by affecting the enthalpy, temperature, or entropy of a fluid. This may be used to favor progression of reaction of interest. The reaction may be the formation or destruction of the molecule.

The reactor has an upper fluid port 130 and a lower fluid port 140. Often, one port is at the top of the reactor and the other port is at the bottom of the reactor. Fluid may be added to the reactor, and the conically spiraling fluid flow channel, through one of either the upper or lower ports, and removed from the other. In one embodiment of the invention the upper port may be used as a fluid flow inlet port to receive a fluid into the reactor and the lower port may be used as a fluid flow outlet to provide a fluid from the reactor. In an alternate embodiment of the invention the upper port may be used as a fluid flow outlet and the lower port may be used as a fluid flow inlet. The outlet port may be located at the bottom of the reactor if the reaction may benefit from pressure-volume energy in the form of hydrostatic pressure head, for example if the unit volume of the products is less than the unit volume of the reactants. The size of the ports, and the ratio of the size of the inner port to that of the outer port, may be determined based on the rheological and other properties of the fluid. The sizing of such ports is a routine undertaking for those having an ordinary level of skill in the reactor design arts and having the benefit of the present disclosure.

As will be discussed in greater detail below, the conically spiraling fluid flow channel may be used to influence a reaction carried out in the reactor. The conical spiral comprises a cone angle, a base diameter at the base of the cone, and a top diameter at the top of the cone. The spiral contains a plurality of rotations about the cone axis that depend upon the height and the spiral pitch. The height of the illustrated reactor and the height of the spiral are the same, although this is not required. The vertical distance or height measured from the inlet to the outlet may be determined in order to obtain a desired static pressure differential between the inlet and the outlet. The pressure differential may be used to favor the formation of a product species. For example, in a reaction that produces a gas the outlet may be at the top, at a lower pressure than the inlet, in order to favor the formation of the gas and avoid suppressing the extent of the reaction with the static pressure head. Likewise, in a reaction that consumes net moles of gas the outlet may be at the bottom, at a higher pressure than the inlet, to favor conversion of the gas to product. The height and the spiral pitch may also depend upon the desired interaction with the force of gravity. A precipitate produced by a reaction may be more likely to separate from a fluid in a reactor with a smaller spiral pitch compared to a larger spiral pitch. There is a lesser vertical fluid flow force vector on the precipitate particle in the smaller spiral pitch.

A fluid may be flowed through the conically spiraling fluid flow channel to form a conically spiraling fluid flow. The fluid may comprise a liquid, gas, slurry (liquid and solid), or other fluid (e.g., mixed fluid of gas and slurry). The fluid flow channel may comprise a pipe, tube, conduit, duct, or other hollow body through which a fluid may flow. As used herein, spiral refers to a three-dimensional curve or form containing one or more turns about an axis. The spiral may comprise a conical spiral curve or form that winds around a cone. The spiral need not be regular. The spiraling angle may be constant, may increase, may decrease, or may be irregular. The illustrated spiral turns clockwise, when viewed from the outlet to the inlet, whether or not the outlet is at the top or the bottom of the cone. A counterclockwise spiral may also be used. The cone may be a right cone in which the axis is perpendicular to the plane containing its base. The particular conically spiraling fluid flow channel has a changing spiraling diameter. That is, the diameter of the spiral is smaller at the top of the conical frustum than at the bottom. In the case of a cone or conical frustum the change in the diameter is nearly constant with height, although this is not required. In other embodiments of the invention the change in the diameter with height may be inconstant and the rate of change may vary along the spiraling fluid flow channel (see FIGS. 4–5). In other embodiments of the invention, the spiraling diameter may be substantially constant. For example, the spiraling fluid flow channel may comprise a helix curve or form that winds around a uniform cylinder about a central axis at a constant spiral angle (not shown).

The spiral may offer a number of advantages that have heretofore been unrecognized and unappreciated. The spiral may allow formation of a magnetic field that may influence the thermodynamics of a reaction carried out in the reactor. The inventors contemplate using different spiraling diameters to increase or decrease the entropy of a fluid in the reactor in order to thermodynamically influence the extent of reaction. In the case of an electrochemical reactor containing spiraling anode and cathode, which will be discussed in greater detail below, changing the diameter of the spiral, for example in a conical spiral, may allow changing the strength of the magnetic field experienced by the fluid in the spiraling fluid flow channel. A smaller diameter and a correspondingly larger magnetic field may thermodynamically stabilize conductive materials and may be used to favor a reaction in which the products are more conductive than the reactants.

Changing the diameter of the spiral may also allow changing the rate of change of the directional momentum of the fluid in the channel. In a smaller diameter spiral the flow direction of the fluid may change at a higher rate than in a larger diameter spiral. This may influence the fluid mechanics e.g., the laminar or turbulent flow of the fluid. A fluid flowing through a small diameter spiral may experience more fluid mixing and entropy (e.g., more turbulence or a higher Reynolds Number) than the fluid flowing through a larger diameter spiral. As an illustration, turbulence often occurs when a laminar fluid enters an elbow pipefitting. To decrease the entropy of the fluid in flow at the outlet a larger spiral diameter may be used at the outlet, or to increase the entropy of the fluid in flow at the outlet a smaller spiral diameter may be used at the outlet. A smaller diameter may force the fluid to turn about the spiral more abruptly and may invoke a greater amount of fluid mixing. This is at least conceptually similar to the fluid mixing that may occur at a conventional pipe elbow.

Figure 2:
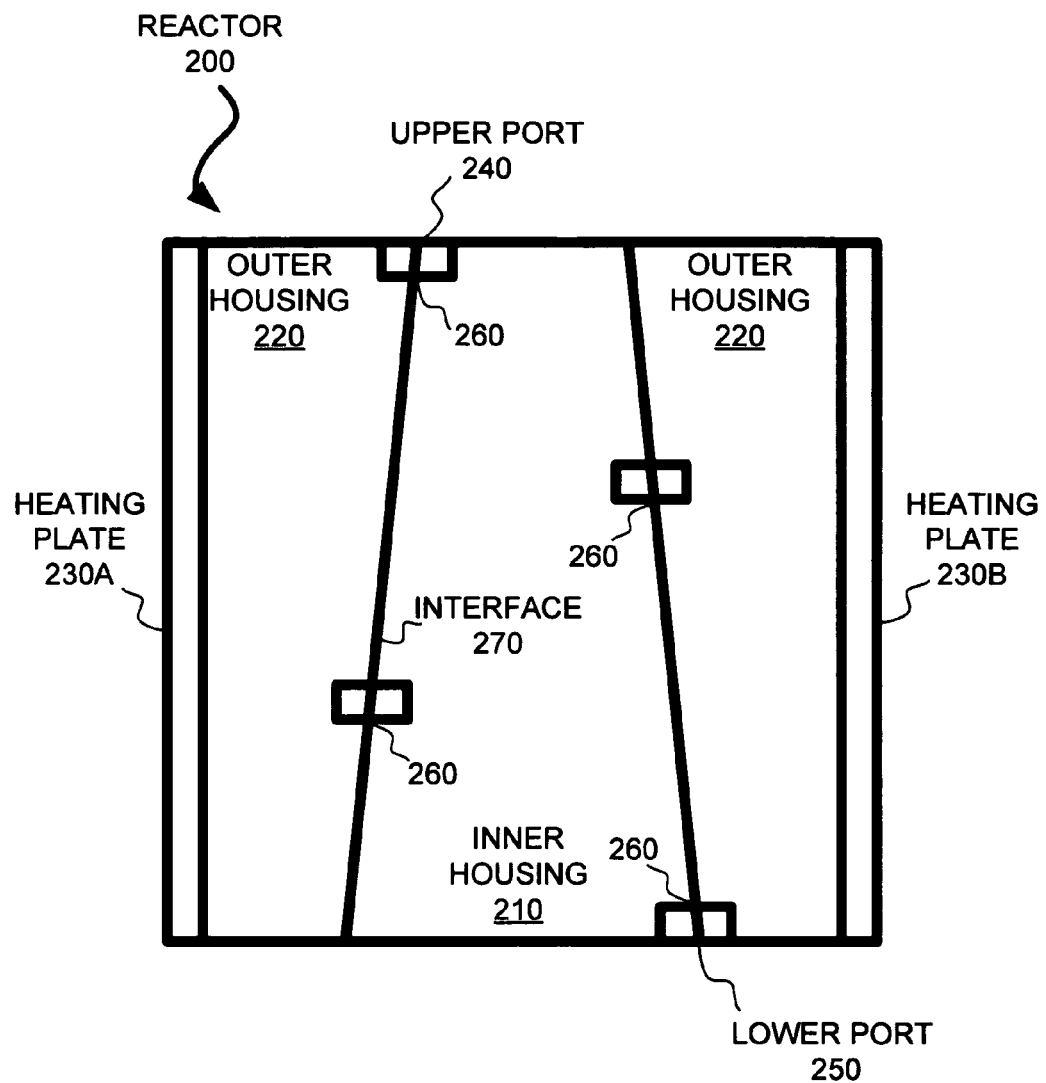
FIG. 2 shows a cross-sectional view of a reactor that contains an inner housing, a mating outer housing, thermal heating and/or cooling plates, and rectangular cross sections of a fluid flow channel including at an upper port and at a lower port, according to embodiments of the invention.

FIG. 2 shows a cross-sectional view of a reactor 200 that contains an inner housing 210, a mating outer housing 220, thermal heating and/or cooling plates 230A–B, and rectangular cross sections of a fluid flow channel 260 including at an upper port 240 and at a lower port 250, according to embodiments of the invention. The reactor contains the inner housing inserted into the void of the outer housing. The membrane is disposed between the housings. The inner housing has voids, depressions, or grooves representing a first fluid flow channel portion. The outer housing has corresponding voids, depressions, or grooves representing a second fluid flow channel portion. When the inner housing is inserted into the void of the outer housing the first fluid flow channel portion and the second fluid flow channel portion may combine to form the fluid flow channel. The membrane may divide the first and the second fluid flow channel portions.

The reactor comprises the inner housing containing spiraling voids representing a first spiraling fluid channel portion and an outer housing containing corresponding spiraling voids representing a second spiraling fluid channel portion. The outer housing contains an internal void with the inner housing inserted therein. The inner and outer housings may have different shapes and sizes. As an example, the outer housing may be a hollowed-out cylinder, cone, or conical frustum, with the void centered along a central axis of symmetry. In the illustrated reactor the outer housing comprises a hollowed out cylinder with a conical void, although this is not required. The inner housing may comprise a corresponding smaller cylinder, cone, or conical frustum that may be inserted into the void by aligning the central axis of the inner housing with that of the outer housing and inserting the inner housing into the outer housings void. A conical frustum is a truncated cone wherein the basal part of a solid cone is formed by cutting off the top by a plane substantially parallel to the base. In the illustrated reactor the inner housing comprises a conical frustum, although this is not required. The inner diameter or bore (the inner surface of the hollow cylindrical or conical outer housing) of the outer housing may correspond to the outer diameter of the inner housing. The inner housing may seat against the outer housing at an interface 270.

Figure 3:
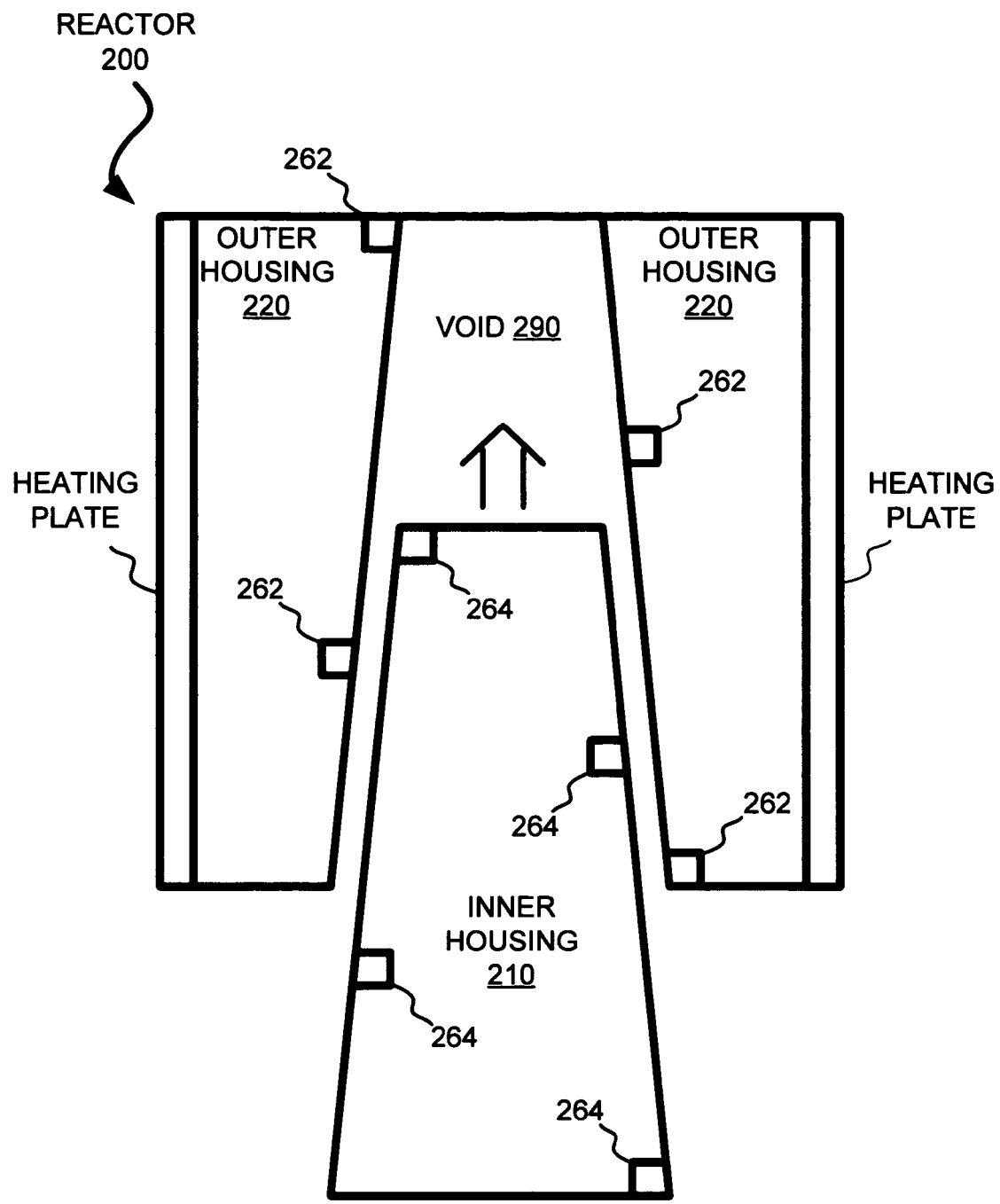
FIG. 3 shows another cross-sectional view of the reactor shown in FIG. 2 wherein the inner housing is being inserted into a void of the outer housing, according to embodiments of the invention.

FIG. 3 shows another cross-sectional view of the reactor shown in FIG. 2 wherein the inner housing 210 is being inserted into a void 290 of the outer housing 220, according to embodiments of the invention. The outer housing contains fluid flow channel portions 262 formed therein and the inner housing has corresponding mating fluid flow channel portions 264 formed therein. The cross sections of the fluid flow channel portions are shown although it will be appreciated that the fluid flow channel portions may spiral about the axis of the housings. In embodiments of the invention, the fluid flow channel may comprise a first spiraling rectangular channel, depression, or groove formed in the inner housing and a corresponding mating second spiraling rectangular channel, depression, or groove formed in the outer housing The housing may comprise a solid substrate, workpiece, or the like in which the channel may be formed. The spiraling channel portion of the inner housing may be complementary to the spiraling channel portion of the outer housing. The channel portions of the inner and the outer housings may mate to form the spiraling fluid flow channel when the inner housing is inserted into and mated with the outer housing. As desired, the fluid flow channels may be sealed with a gasket, with a sealant, with a silicon rubber compound when the inner housing is inserted into the outer housing. One advantage of this design is that the inner and the outer housings may be changed out and modified individually. For example, if the reactor is to be used for a different reaction for which more volume on the inner housing fluid flow channel portion is desired, the inner housing may be modified, for example to create deeper grooves.

The cross sectional area of a fluid flow channel may be constant, or may be varied, along the length of a spiraling fluid flow channel. Referring to FIG. 2, the area of the fluid flow channel cross sections 260 may be the same or may be different. The cross sectional area may be changed in order to adjust the flow rate of fluid through the channel at that particular cross section. The velocity of the fluid through the channel is proportional to, or at least related to, the volumetric flow divided by the cross sectional area. The velocity of the fluid may be increased, decreased, or maintained constant. Increasing the velocity of the fluid may increase its entropy and disorder due to increased fluid mixing, eddying, and/or turbulence. Decreasing the velocity may decrease the entropy and disorder.

One way in which the size and shape of the reactor may be determined based on physicochemical characteristics of one or more molecules or of a reaction is determining fluid flow channel cross section based on density change for a reaction. In one embodiment of the invention the cross sectional area of the fluid flow channel may be varied along the fluid flow path to compensate density changes due to reaction and thereby maintain a substantially constant fluid flow velocity. It is an aspect of one embodiment of the invention, that the velocity of the fluid through the channel be maintained substantially constant along a fluid channel, for a reaction in which the products have a different density (ratio of mass per volume) than the reactants, by adjusting the cross sectional area to compensate for the changing density due to reaction. For example, if the density decreases due to reaction the cross sectional area of the fluid flow channel at the outlet may be correspondingly greater than the cross sectional area of the fluid flow channel at the inlet to compensate for the change in density and allow a substantially constant fluid velocity through the channel. As an example, in the electrolysis of water, the density of acid ion water may increase relative to that of alkaline ion water and the cross sectional area of the fluid flow channel for the acid ion water may be decreased while the cross sectional area of the fluid flow channel of the alkaline ion water may be increased, along the length of the fluid flow path through the reactor. The gradient, either the covarient or the contravarient, according to the density and/or pressure change, may depend upon the particular reaction.

Figure 4:
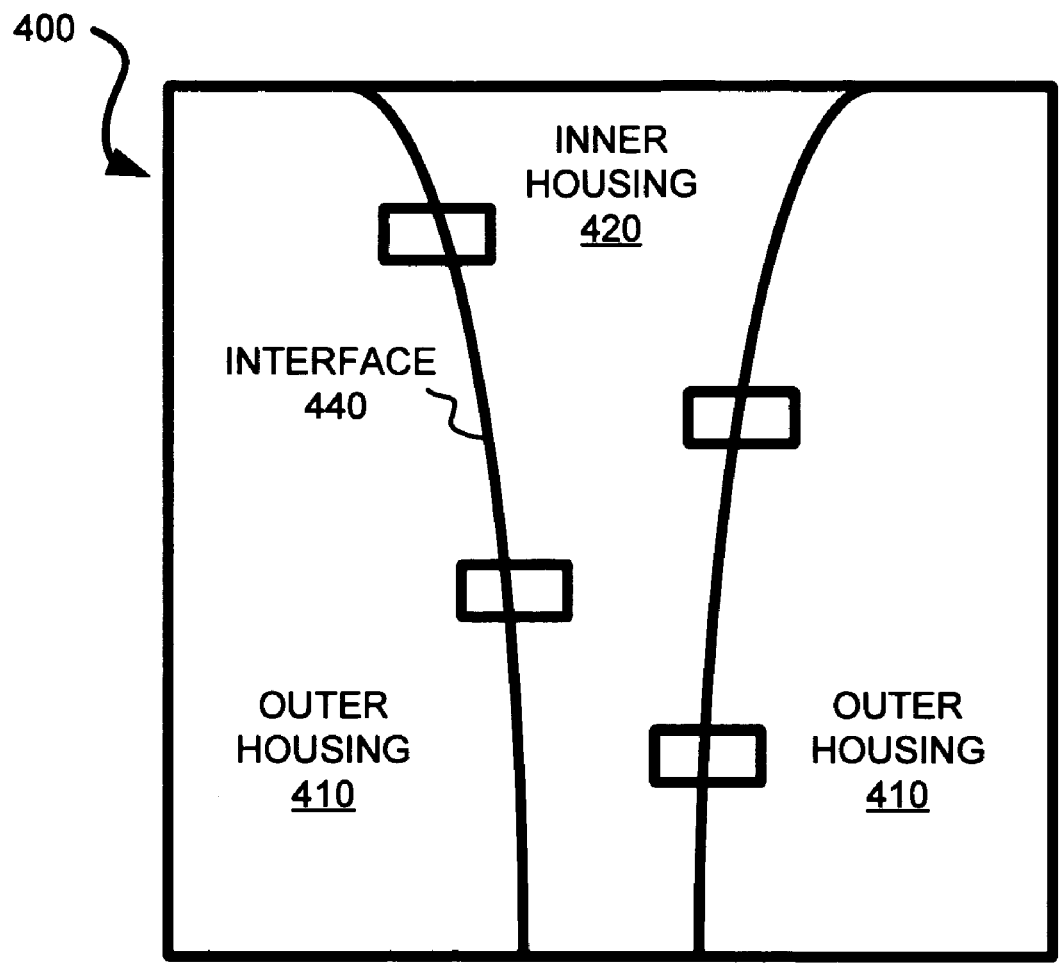
FIG. 4 shows a cross-sectional view of a reactor that has mating inner and outer housings that meet at an interface that is characterized by an increasing spiraling diameter change with increasing vertical distance, according to embodiments of the invention.
Figure 5:
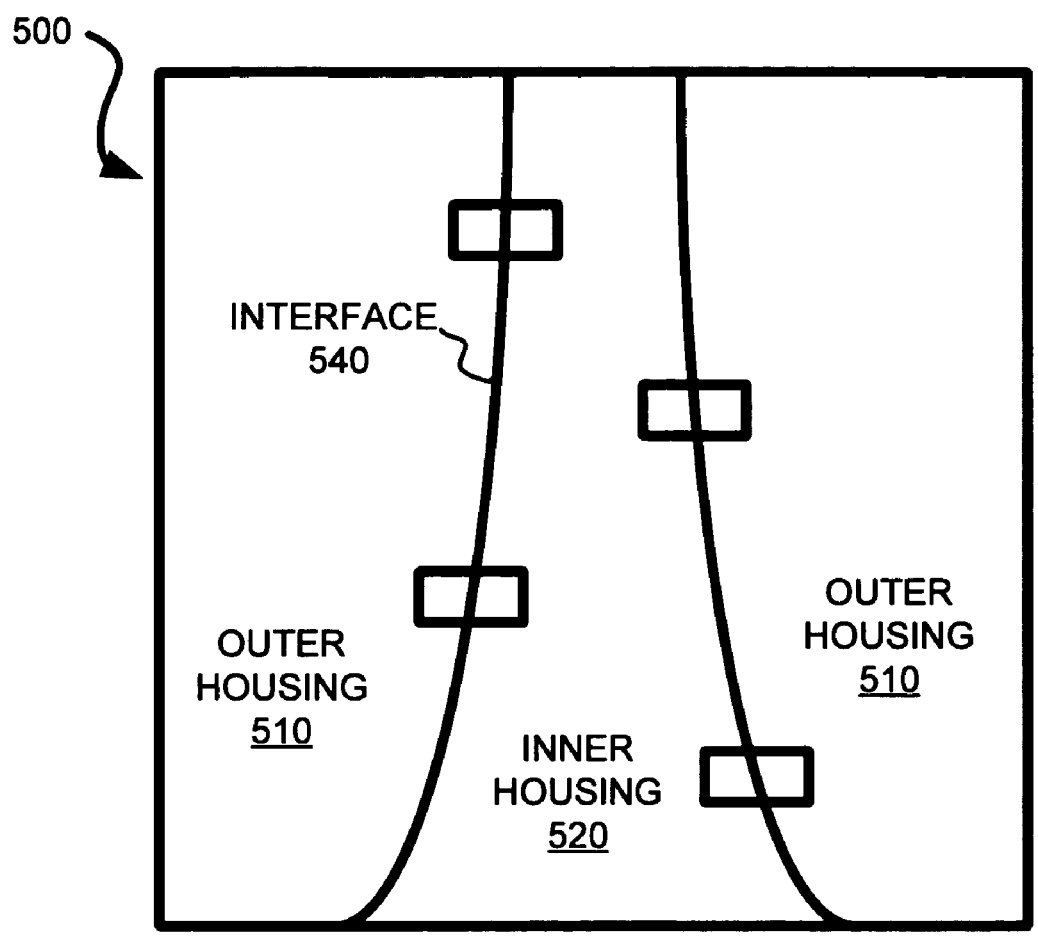
FIG. 5 shows a cross-sectional view of a reactor that has mating inner and outer housings that meet at an interface that is characterized by an decreasing spiraling diameter change with increasing vertical distance, according to embodiments of the invention.

A constantly changing spiral diameter (as in the case of a uniform conical spiral) is not required. FIG. 4 shows a cross-sectional view of a reactor 400 that has mating inner 420 and outer housings 410 that meet at an interface 440 that is characterized by an increasing spiraling diameter change with increasing vertical distance. FIG. 5 shows a cross-sectional view of a reactor 500 that has mating inner 520 and outer housings 510 that meet at an interface 540 that is characterized by an decreasing spiraling diameter change with increasing vertical distance.

The reactor of these embodiments may be molded, embossed, machined, or otherwise formed. Likewise, the channels may be molded, embossed, machined, engraved, routed, cut, or otherwise formed. A number of materials are suitable for the reactor including plastics (polyethylene, polypropylene, polystyrene, poly-vinyl chloride (PVC), food-grade plastics, etc.), ceramics (e.g., technical ceramics), glass (e.g., borosilicate glass), glass-ceramics, metals (e.g., stainless steel, copper, aluminum, etc.), wood, etc. A composite may comprise an outside material that transmits sonic energy well (e.g., ceramic) and an inside material may be inert (e.g., a plastic). It is an aspect of embodiments of the invention that the material used in the reactor stabilizes reaction products (e.g., ions). As an example, a reactor containing a hydrophyllic, conductive, polar, or ionized surface along the fluid flow channel may help to stabilize electrolyzed water, or other polar fluids, and favor the formation of electrolyzed water from water, which is less ionic and less polar.

Figure 6:
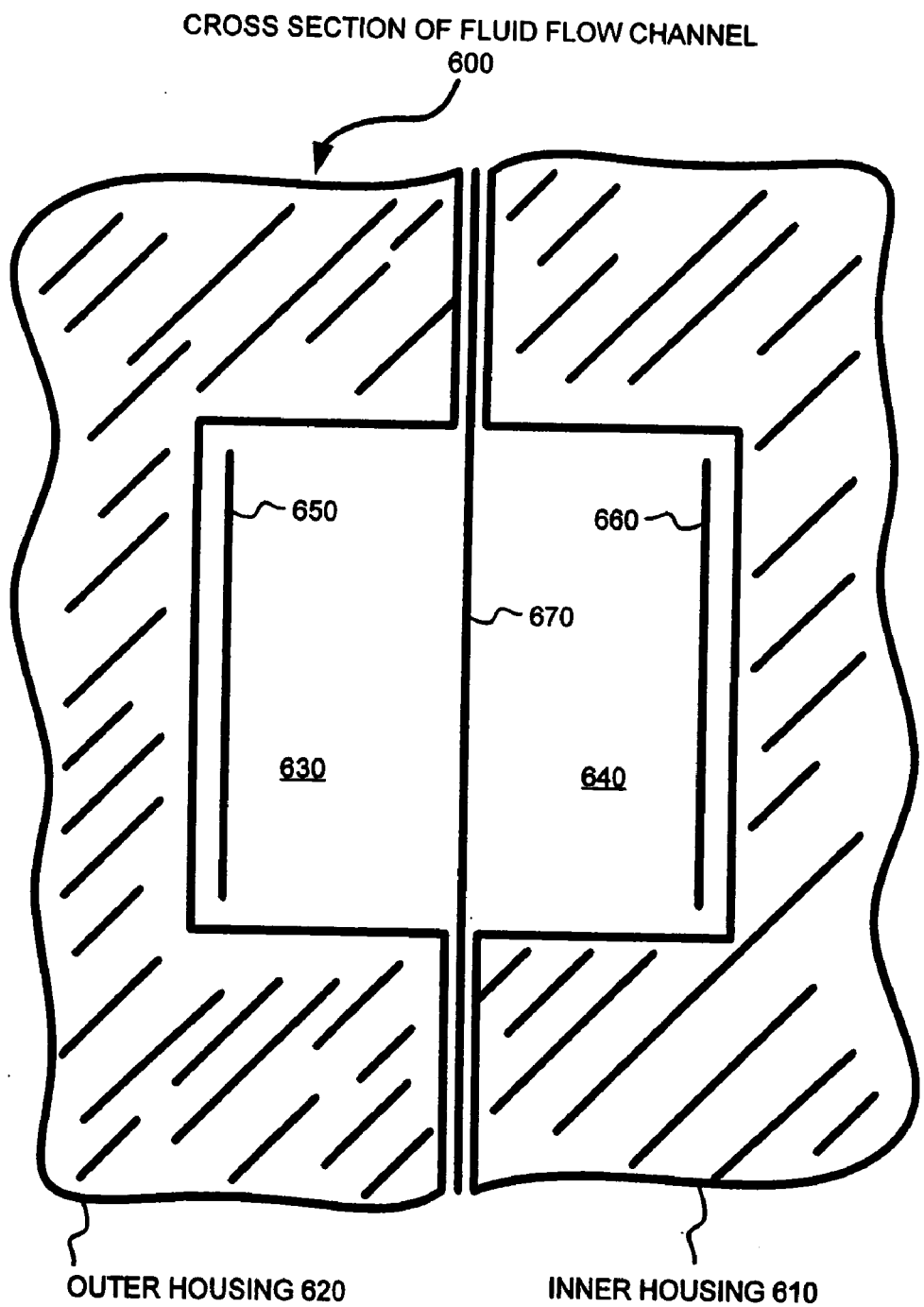
FIG. 6 shows a cross-sectional view of a fluid flow channel, according to embodiments of the invention.

The reactors may be used as electrochemical reactors for water or other compounds. The fluid flow channel for an electrochemical reactor may comprise an anode, a cathode across from the anode, and a membrane disposed between the anode and the cathode. FIG. 6 shows a cross-sectional view of a fluid flow channel 600, according to embodiments of the invention. The channel comprises a first fluid flow channel portion 630 formed in an outer housing 620 and a second fluid flow channel portion 640 formed in an inner housing 610. A membrane 670 is disposed between the inner and the outer housings and separates the first and the second fluid flow channel portions. A first electrode 650, such as an anode, is affixed to the outer housing, along a wall of the first portion that is opposite the membrane. Likewise, a second electrode 660, such as a cathode, is affixed to the outer housing, along a wall of the first portion that is opposite the membrane. The electrodes may be positioned across from one another with fluid and a membrane disposed between them.

In the illustrated fluid flow channel, the anode and the cathode are opposite from one another, on opposite sides of the fluid flow channel, with the membrane disposed approximately halfway between. The distance between an electrode and the membrane, for different positions along the spiraling fluid channel, may be kept constant or may be varied with position. As one example, the distance between the electrode and membrane may be decreased to promote a greater electrical field to drive a reaction. The height (vertical walls)

to width (horizontal walls) of the rectangular cross section channel may be in the range of approximately 2:1 to 3:1 to provide a relatively large amount of the fluid within the channel proximate to the electrodes affixed to the vertical walls, although this is not required. The distance from a first electrode to the membrane may be different than the distance between the second electrode and the membrane. This may allow different reaction conditions and reaction driving force in each fluid flow channel portion on one side of the membrane. This may cause different reaction rates and chemical equilibrium conditions on opposite sides of the membrane.

The anode and the cathode may spiral about the substantially central vertical axis of the reactor. The anode may be elongated and rectangular (e.g., like a ribbon) that spirals opposite from and substantially parallel to a corresponding similarly elongated rectangular cathode. The spiral may provide a substantially higher electrode surface area to fluid volume ratio than many prior art electrochemical reactors. The spiral may be substantially symmetrical and uniform about the axis, although this is not required. The anode and the cathode may conically spiral about the axis. The diameter of the conical spiral may increase or decrease with vertical distance away from the base of the reactor.

A magnetic field may form in the spiral fluid flow channel due to electric current that flows through spiral shaped anode and cathodes. Current carried through spiraling electrodes may form an electric current. An electrolytic fluid containing charged ions that flows through the channel may also create a magnetic field. The magnetic field comprises energy that may influence the thermodynamics of the reaction. The strength or intensity of the magnetic field may be greater at different points in the reaction path than at others. One way of achieving this is to increase or decrease the diameter of the spiral. As an example, the magnetic field may be stronger in the small diameter section of a conical spiral than in the large diameter section. The strength of the magnetic field dies off approximately as the square of the distance from is point of origin. In a reactor having an upright conical spiral (with the smaller spiral diameter at the top), the magnetic field may be increased from the inlet at the bottom to the outlet at the top, for example, to provide an environment at the outlet that favors the formation of magnetic field stabilized reaction products. Such magnetic field loving reaction products may include but are not limited to conductive materials, ionic solutions, acid ion solutions, alkali ion solutions, conductive polymers, liquid crystals, metal precipitates, nanoparticles, etc. The presence of the magnetic field may favor the formation of these compounds, thermodynamically speaking, and allow improved reaction yields. Accordingly, in embodiments of the invention a magnetic field may be formed, by flowing electrical current through spiraling anode and cathode and by flowing an electrolytic fluid through a spiraling fluid flow path, in order to influence the thermodynamics of a reaction.

The membrane may represent a structure having lateral dimensions much greater than its thickness through which mass transfer, or permeation, may occur under a variety of driving forces. The membrane may comprise an ion permeable membrane such as a cation-exchange membrane, an anion exchange membrane, or a bipolar membrane. A cation-exchange membrane is a membrane containing fixed anionic charges and mobile cations which can be exchanged with other cations present in an external fluid in contact with the membrane. The cation-permeable membrane may comprise a proton-permeable membrane, a proton exchange membrane, or the like. An anion-exchange membrane is a membrane containing fixed cationic charges and mobile anions that can be exchanged with other anions present in an external fluid in contact with the membrane. A bipolar membrane is a synthetic membrane containing two oppositely charged ion-exchanging layers in contact with each other. In addition, any desired combination of these different types of membranes may be arranged together for more advanced processes. The material of the charged groups in the membrane and the method of bipolar assembly may be selected based on the type of reaction of interest. The membrane may serve many roles including as an entropic boundary. Entropic gradients may be orientated with respect to the entropic boundary membrane to generate a system where optimized work on a chemical reaction is accomplished. The membrane may also provide an interface that allows the efficient splitting of polar molecules (e.g., water in the case of an electrolyzer). Exemplary ion permeable membranes that are suitable include but are not limited to Nafion® cation-exchange membranes available from E. I. du Pont de Nemours & Co. of Wilmington, Del. Other ion permeable membranes are known in the art.

In embodiments of the invention in which a membrane is used the inlet port and the outlet port may comprise dual ports. The inlet dual port may distribute flow to both sides of the membrane and the outlet dual port may provide flow from both sides of the membrane without mixing the fluids. If the fluids introduced into the reactor and provided from the reactor are not to be mixed the dual ports may contain flow separation manifolds to keep the flows on opposite sides of the membrane separate.

To illustrate the concept consider the following approach for forming a reactor according to embodiments of the invention. Initially, two square solid blocks of a polymeric material, for example high-density polyethylene, may be obtained. A conical frustum may be machined from a first of the solid squares, for example with a lathe. A spiral channel portion, having a square or rectangular cross section, may be machined in the outer surface of the conical frustum, for example with a router. A cylinder having a diameter greater than the base of the conical frustum of the inner housing may be machined from the second solid square. A lathe may be used, although this is not required. A conical frustum void or cavity having a shape and size sufficient to just accommodate the inner frustum may be formed in the cylinder, for example with a drill. The cylinder having the conical frustum void may be cut in half parallel to the axis of the cylinder. Spiral channel portions, having a square or rectangular cross section, may be machined in the cylinder halves, for example with a router. Then, the two cylinder halves may be fastened together, for example with an adhesive, bolts, or the like. Then, the inner housing may be inserted into the void of the outer housing with a membrane disposed between them. for example as a sheet that is wrapped around the inner housing and fastened membrane may be placed against the outer surface of the inner housing and the inner housing.

Then, anode and cathode electrodes may be inserted into the spiral channel portions of the inner and outer housings. The electrodes may contain conductive materials such as metals (as used herein the term metal will include metal alloys). The electrodes may be in elongated and flexible forms such as thin elongated metal sheets or ribbons, meshes, screens, wires, groups of wires, or the like. The electrodes are commercially available from numerous sources. One suitable source is Anomet Products of Shrewsbury, Mass. The electrodes may be inserted along the bottom of the spiral channel portions and affixed with a fastener, such as an adhesive, staple, clip, or the like.

The electrochemical reactor may be used as an electrolyzer or water ionization device for forming electrolyzed or ionized water. Electrolyzers are electrochemical reactors and water ionization devices that may be used to manufacture electrolyzed water, namely alkali ion water and acid ion water. The electrolyzer uses ionization to split water (H2O) into hydrogen ions (H+) and hydroxide ions (OH−). Water may be added through the inlet port and flowed in the channel between the anode and the cathode. The anode, the cathode, and the membrane may form electrolyzed water. Acid ion water may form on one side of the membrane and alkaline ion water may form on another side. Hydrogen and oxygen gas may also form on opposite sides of the membrane, and the hydrogen may be used in a fuel cell or other application, as an example.

Figure 7:
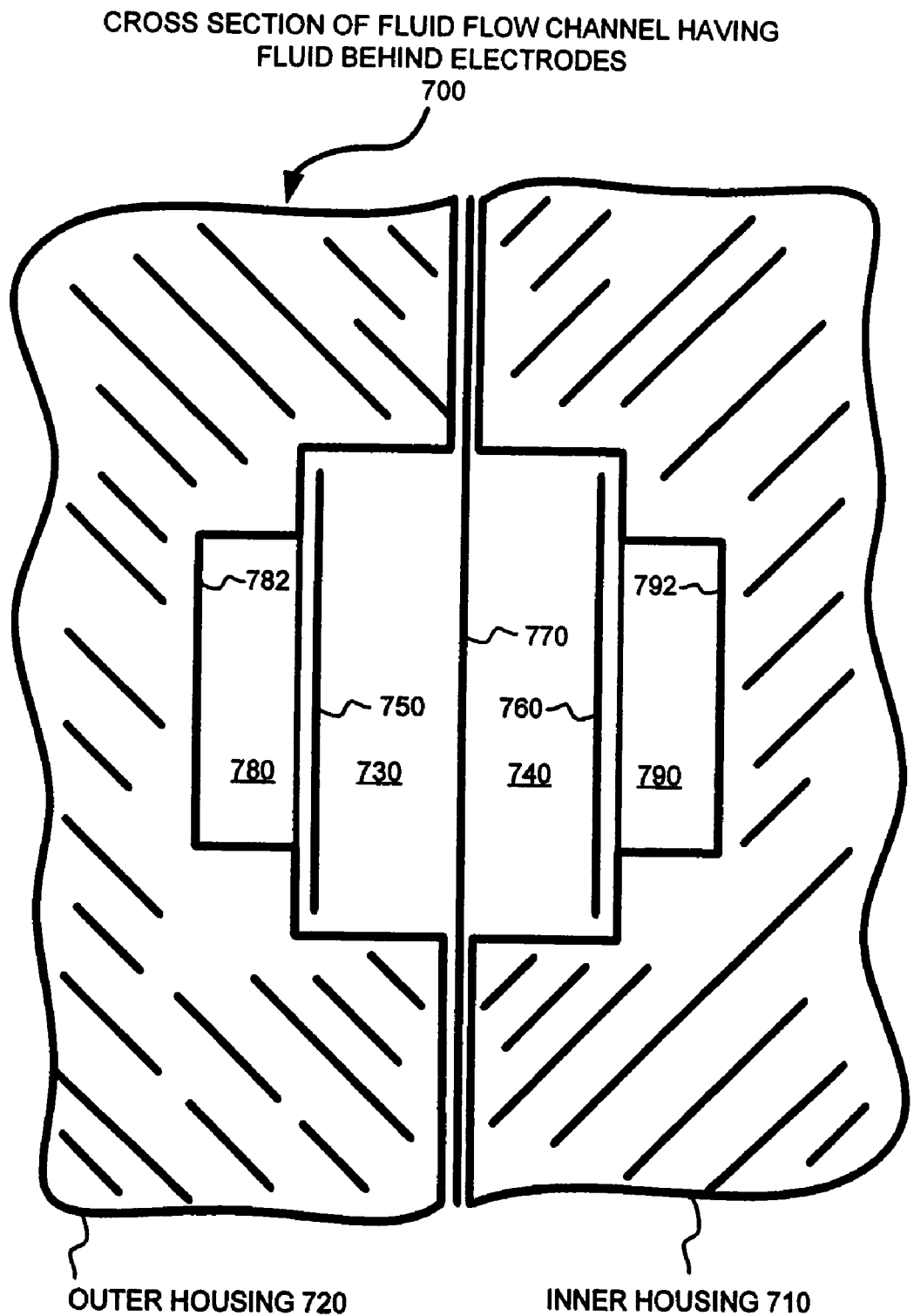
FIG. 7 shows a cross-sectional view of a fluid flow channel of an electrochemical reactor that contains fluid flow channel portions and on the opposite side of the electrodes than the membrane, according to embodiments of the invention.

FIG. 7 shows a cross-sectional view of a fluid flow channel of an electrochemical reactor that contains fluid flow channel portions 780 and 790 on the opposite side of the electrodes 750 and 760, respectively, than the membrane 770, according to embodiments of the invention. The channel portion 780 is behind the electrode 750 when viewed from the membrane 770. The electrode may be substantially permeable to the fluid within the channel and may comprise a screen electrode, a mesh electrode, a porous electrode, or the like. The fluid may readily pass through such permeable electrodes. The size of the portions 780 and 790 may be constant, increasing, or decreasing along the fluid flow channel of a reactor. The distance from the electrode to the membrane substantially equals the distance from the electrode to the back of the fluid flow channel portion, although this is not required. An advantage of having the fluid on both sides of the electrode is better utilization of electrode surface area. About twice as much electrode surface area is available for electrochemical reaction. Additionally, since fluid may approach the electrode surface from two directions the diffusion of reactants to the electrode becomes less limiting. This may improve the kinetics of the electrochemical reactions. Additionally, the fluid within the void portion 780 behind the electrode 750 may experience unbalanced electrical and magnetic fields generated by the proximate electrode 750. This may be used to control or adjust the enthalpy of a conductive, polar, or electrolytic fluid. The electrical and magnetic fields may align polar molecules (see e.g., FIG. 19). Also, the curvature around both of the electrodes, the anode and the cathode, may produce a large gradient due to field curvature, which may favor the breaking of covalent bonds.

It is not required that the reactor have symmetrical fluid flow channel portions on both sides of the membrane, as shown in FIGS. 6 and 7. In alternate embodiments, as an example, a reactor may comprise the left-hand fluid flow channel portion of FIG. 6 and the right-hand fluid flow channel portion of FIG. 7. Additionally, different distances between the electrode and the membrane may be used for the anode and the cathode.

Figure 8:
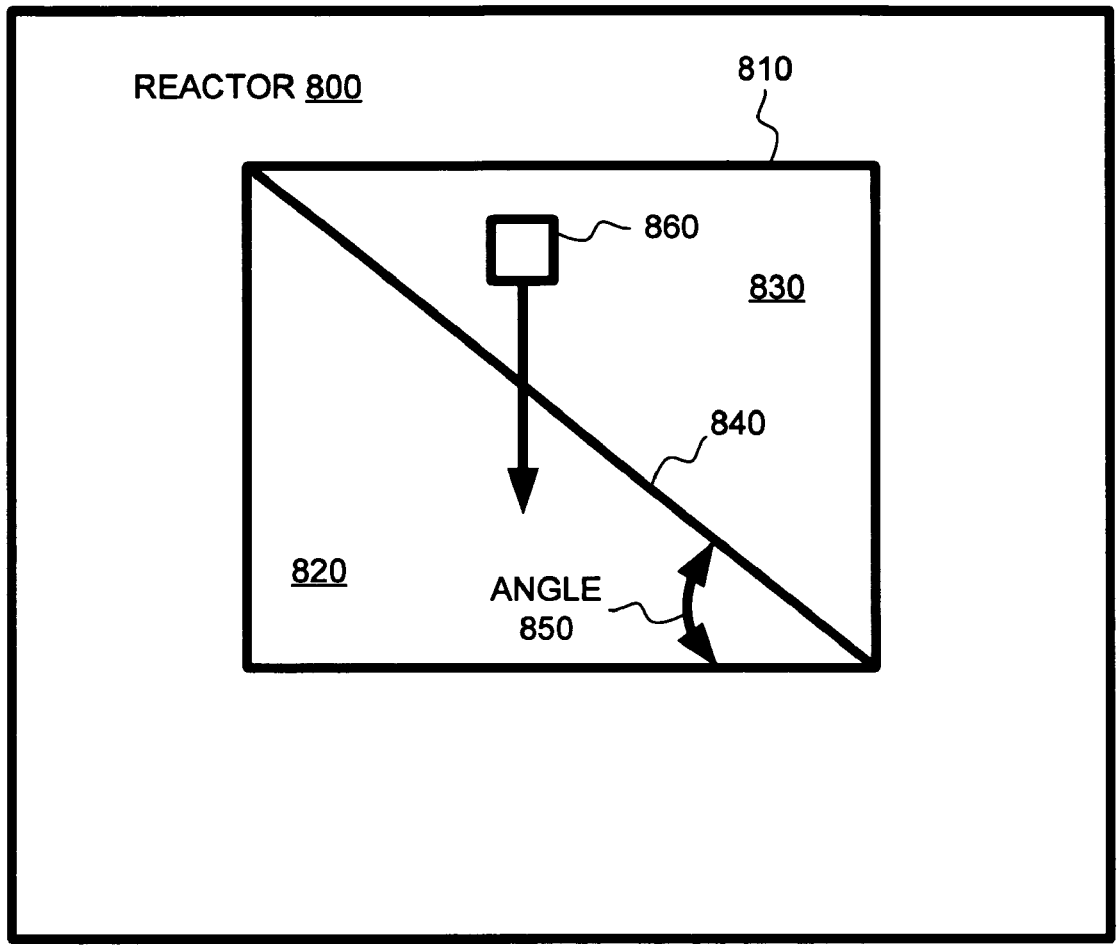
FIG. 8 shows a reactor containing a fluid flow channel having a membrane that separates a lower fluid flow channel portion from an upper fluid flow channel portion, according to embodiments of the invention.

FIG. 8 shows a reactor 800 containing a fluid flow channel 810 having a membrane 840 that separates a lower fluid flow channel portion 820 from an upper fluid flow channel portion 830, according to embodiments of the invention. The membrane has an angle 850 relative to horizontal that is different than perpendicular (i.e., less than 90°). Horizontal is defined here as perpendicular to the direction of gravity. The angle may have any desired value in the range of approximately horizontal (e.g., 0°) to slightly less than perpendicular to horizontal (e.g., 89.9°). Of course, the angle of the membrane may also be represented as 180° minus the angle shown. As shown, the angle of the membrane may allow a species 860, for example a precipitate a polymer, a molecular cluster, a hydrate, a colloid, a protein, a water drop within an oil, or the like, within the upper chamber portion to move to the lower chamber portion, across the membrane, due at least in part to gravity separation. The membrane may also allow fluid separation based on density, with the lighter fluid tending to rise into the upper chamber portion and the heavier fluid tending to sink into the lower chamber portion. In this way the angle of the membrane may promote one fluid with a lower density to collect on the upper side of the membrane and another fluid with a higher density to collect on the lower side of the membrane. Likewise, a species such as a gas may move from the lower channel portion to the upper channel portion (not shown). One approach for angling the membrane involves providing an angle between an inner housing and an outer housing (see e.g., FIGS. 4 and 5). The inner housing may represent an upright or inverted conical frustum.

Figure 9:
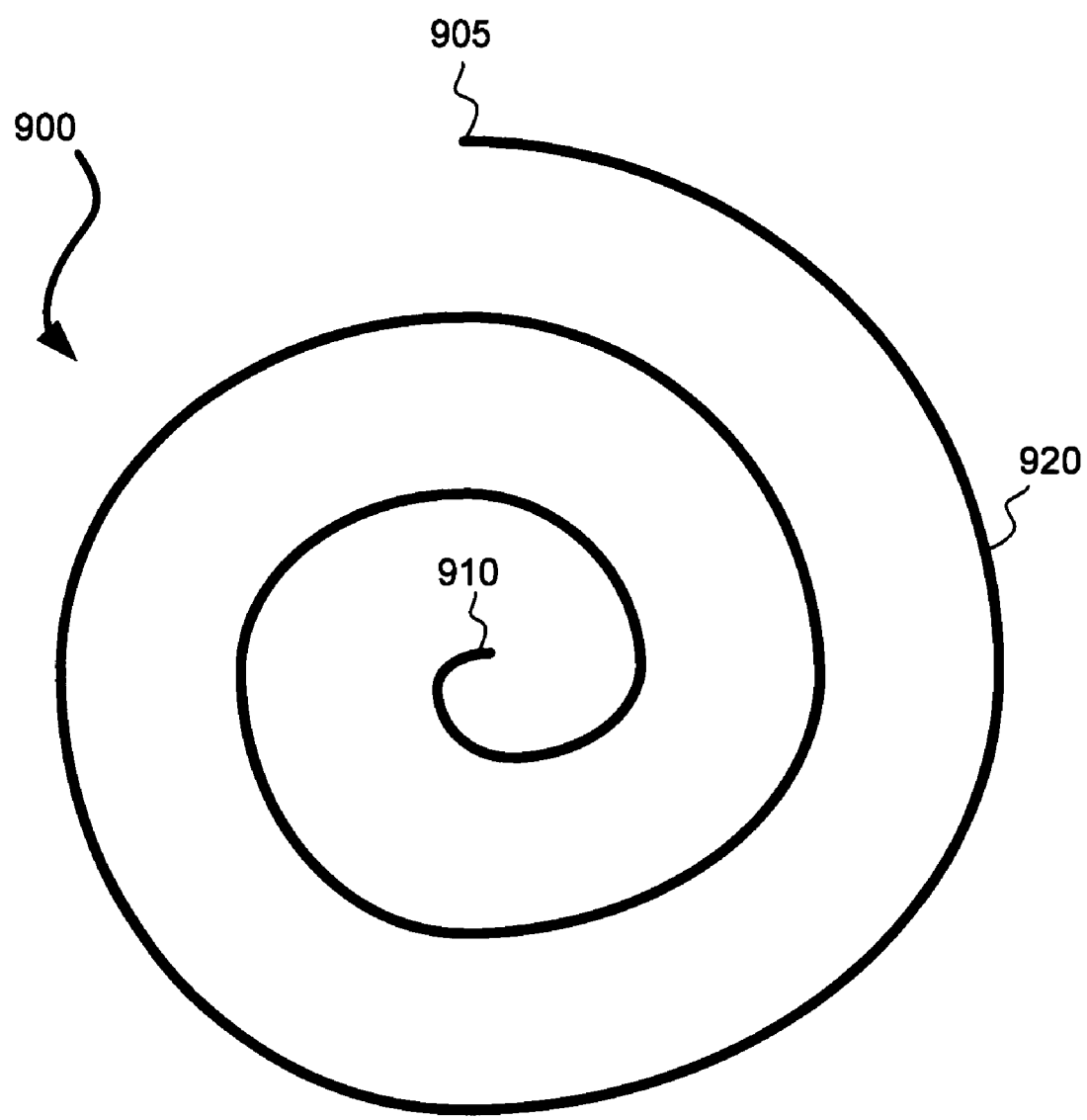
FIG. 9 shows a reactor having a planar spiraling fluid flow channel, according to embodiments of the invention.

Numerous other reactors having spiraling fluid flow channels are contemplated. In embodiments of the invention, the reactor may contain a cylindrical or rectangular coil that is self-supported instead of formed within a solid reactor housing. FIG. 9 shows a reactor 900 having a planar spiraling fluid flow channel 920, according to embodiments of the invention. Fluid may be added to one of the fluid flow ports 905 and 910 and removed from the other. The spiral at the port 905 has a larger spiraling diameter than the fluid near the port 910. In one embodiment of the invention the planar spiraling fluid flow channel may be formed in a solid substrate. For example, fluid flow channel portions with rectangular cross sections may be formed in a first solid substrate and corresponding fluid flow channel portions with rectangular cross sections may be formed in a second solid substrate. Routing, embossing, etching, or other approaches may be used for removing the material from the portions. Then, electrodes may be inserted into the channel portions of the first and the second substrates, and a membrane may be placed over the first substrate, and the second substrate may be placed over the first substrate, so that the channel portions are aligned to form a spiraling fluid flow channel with spiraling electrodes opposite one another having the membrane disposed between them, and then the first and the second substrates may be affixed together by fusing, bolting, an adhesive, or the like.

Figure 10:
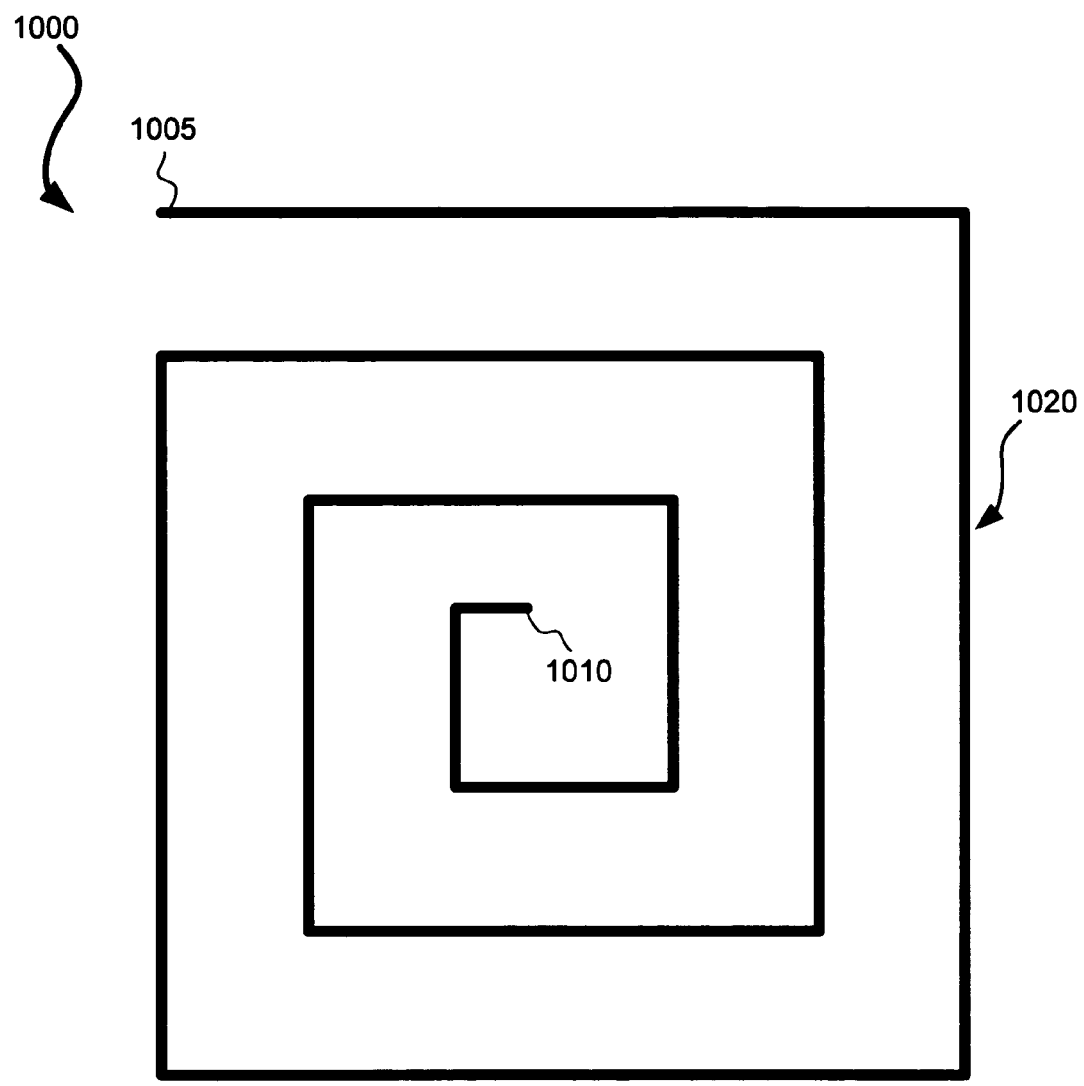
FIG. 10 shows a reactor having a planar square spiraling fluid flow channel, according to embodiments of the invention.

Additionally, it is to be appreciated that the spiral need not have curved surfaces. FIG. 10 shows a reactor 1000 having a planar square spiraling fluid flow channel 920, according to embodiments of the invention. The spiraling "diameter" at an inner fluid flow port 905 is larger than the spiraling "diameter" at an outer fluid flow port 910.

The fluid flow channel may contain mixers to mix and increase the entropy of the fluid therein. The mixers may comprise dynamic motorized mixers, and static inline fluid mixers. A static mixer may contain one or a plurality of inline mixing elements. Suitable mixing elements include among others blades, plates, baffles, or the like to alter the flow of the fluid and encourage turbulence. The mixers are static in that they contain no moving parts and obtain mixing due to pressure difference between the mixer inlet and the mixer outlet. Various types of static inline fluid mixers are commercially available and incorporate different mixing elements. Suitable static inline mixers include Kenics mixers available from Chemineer and SMX mixers available from Kock-Glitsch. Many line mixers are described in J. H. Perry, Chemical Engineers Handbook, Fourth Edition (1963), McGraw Hill Book Co., New York. Other inline static mixers are described in U.S. Pat. No. 4,441,823 to H. Power. The inline fluid mixers may be affixed to the walls of the fluid flow chamber to induce mixing that may cause turbulence. Turbulence is a disorganized, high entropy fluid flow phenomena.

Figure 11:
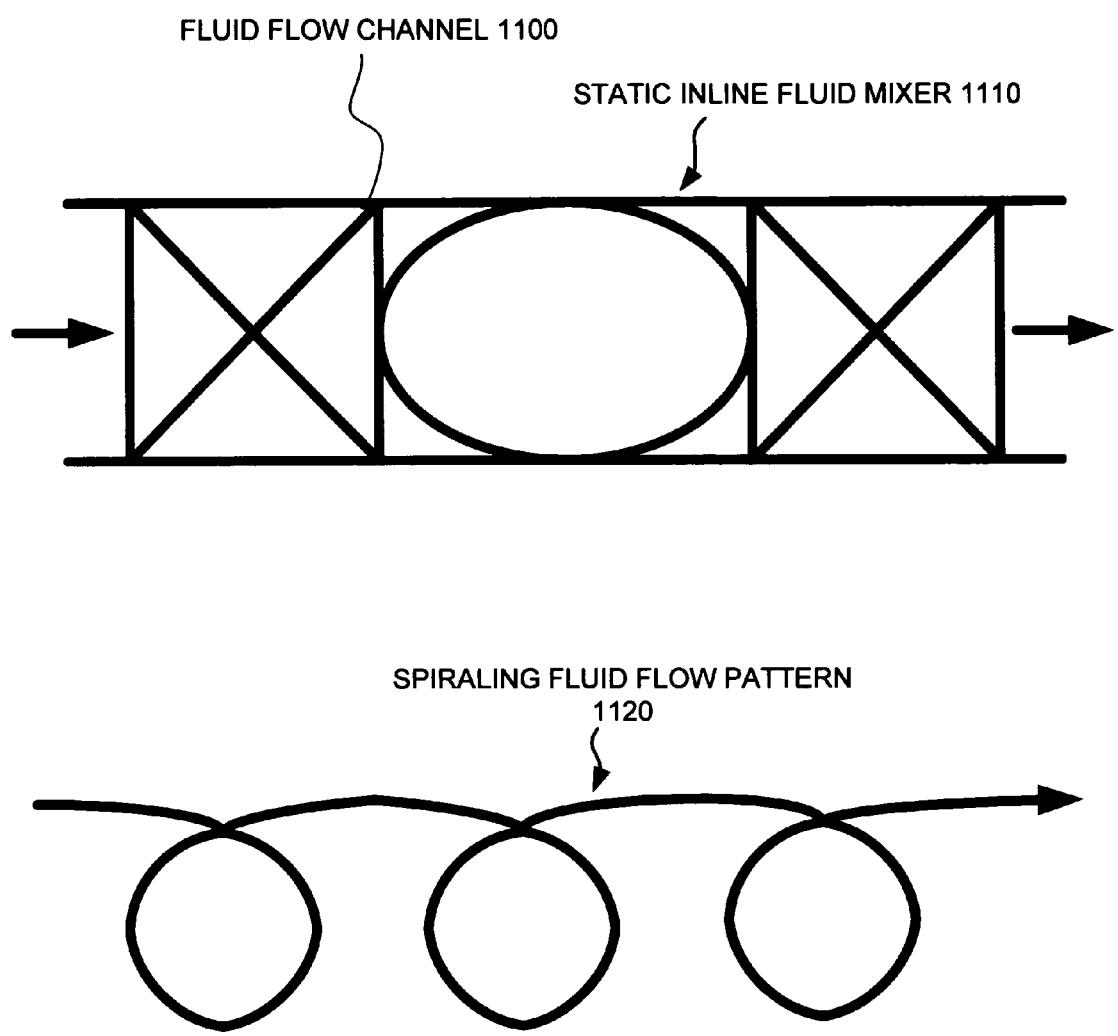
FIG. 11 shows a fluid flow channel containing a static inline fluid mixer, according to embodiments of the invention.

FIG. 11 shows a fluid flow channel 1100 containing a static inline fluid mixer 1110, according to embodiments of the invention. The mixer may comprise a Kenics mixer and the mixing elements may comprise blades. The mixer may comprise a plurality of blades that have predetermined twists and that are aligned in the shape of a helix. Each blade may have a length approximately 1.5 times the cross sectional dimension of the channel and a twist of approximately 180°. The plurality of blades may be configured one after another at a 90° angle so the fluid in the channel is periodically cut by the leading edge of each element. The mixer 1110 may allow forming a spiral fluid flow pattern within a spiraling fluid flow channel. The spiral may provide good fluid mixing and the associated increase in the entropy of the flowing fluid. In addition, although not wishing to be bound by theory, the spiral within the spiral may provide additional benefit in terms of the communication of waveform energy (e.g., from the magnetic field) to the fluid within the reactor. See e.g., "Dynamic Aggregation of Chiral Spinners" by Grzybowski et al., Science, Vol. 296, No. 5568, 26 April 2002, pp. 718–721. See also e.g., "A Fresh Take On Disorder, Or Disorderly Science?", Science, Vol. 297, pp. 1268–1269.

In embodiments of the invention the reactor may contain one or more waveform energy input devices. An exemplary waveform energy input device comprises a pressure forming transducer (e.g., an electricity-to-pressure transducer). The transducer may be used to create pressure gradients or waveforms in the fluid within the reactor. Suitable pressure forming transducers include among others loudspeakers, ultrasound transducers, hydraulic pistons, etc. In embodiments of the invention, pressure energy may be provided to a fluid in the reactor by a sound, for example ultrasound. The ultrasound comprises mechanical energy that is transmitted by longitudinal pressure waves with frequencies above the range of human hearing. The pressure gradients may be orderly or uniform in order to provide the pressure energy in a comparatively low entropy fashion or disorderly or chaotic in order to provide the pressure energy in a comparatively high entropy fashion. In one embodiment, the placement and timing of the transducers may be configured so that the transducers produce resonant peaks and valleys within the reactor. In one embodiment, the disorderly pressure gradients may be applied accordingly to highly disordered wave phenomena. This may be achieved by altering the placement of a plurality of pressure forming transducers in a disordered and irregular arrangement so that the pressure gradients formed by the transducers are also substantially disordered and irregular. This may also be achieved by activating pressure transduction from a plurality of pressure transducers at irregular, random, or chaotic times. In this way, the pressure energy may be provided to the reactor in either an ordered or disordered way, entropically speaking, in order to influence thermodynamics of the reaction within the reactor. In one embodiment of the invention, the reactor may contain microphones or other pressure sensors to sense the pressure and the pressure gradients, and allow tuning or calibrating the one or more pressure forming transducers to achieve either orderly or disorderly pressure gradients within the reactor.

Another exemplary waveform energy input device comprises an electromagnetic radiation input device to provide energy in the form of electromagnetic radiation to a fluid within the reactor. Embodiments of the reactor may contain electromagnetic radiation emitting devices, such as light emitting diodes (LED), lasers, optical fibers, waveguides, or the like, to provide electromagnetic radiation energy input, for example visible or ultraviolet radiation, to the reaction species within the reactor. The electromagnetic radiation may have a frequency (or wavelength) that is based on a reaction of interest. For example, the radiation may correspond to a vibratory frequency of a reactant. In one embodiment of the invention, optical fibers may be configured within inner and outer housings of the reactor to provide electromagnetic radiation conveyed through the fibers from a laser source to the fluid within the reactor. The radiation conveyed by the fibers may energize or excite one or more molecules within the reactor and may drive a reaction. The electromagnetic radiation may be provided continuously or as pulses. In embodiments of the invention, electromagnetic radiation sensors, for example charge coupled devices, or the like, may be incorporated into the reactor to sense radiation within the reactor. This may be used to tune or calibrate electromagnetic radiation addition to the reactor, and may also be used as feedback to control electromagnetic radiation addition to the reactor from the emitting devices.

In embodiments of the invention, a size of a fluid flow channel may be determined based on a frequency associated with a molecule. The frequency may be a natural vibratory frequency for the molecule, a frequency of an electromagnetic radiation used to stimulate or energize the molecule, or another frequency. The molecule may be a reactant molecule, a product molecule, or an intermediate species (e.g., an activated transition species). For example cross sectional dimensions of a fluid flow channel may be determined to at least partially amplify or resonate a frequency of an electromagnetic radiation input waveform used to influence a reaction carried out within the reactor.

Another approach for influencing a reaction involves influencing the entropy of a fluid with texturing on surfaces of the reactor that are in contact with the fluid. The texture of the surfaces may affect the entropy of the adjacent proximate fluid. The texturing, or lack thereof, may affect the entropy of a fluid adjacent to the surface due to fluid flow. The surface may be roughly and irregularly textured. For example, the surface may be scratched, ground, sanded, or the like. The texturing may also comprise material sprayed, sputtered, sprinkled, spackled, or otherwise formed on the underlying surface. The rough and irregular texture may disrupt the flow of an adjacent fluid and may tend to promote swirling, eddying, mixing, and other phenomena that diverge from regular, highly organized laminar flow. The physical texturing, which may comprise bumps, lumps, ridges, or other protrusions, may disrupt laminar flow of an adjacent flowing fluid and may promote at least local turbulence that causes an increase in entropy. Alternatively, the surface may be polished smooth. A fluid may flow relatively quiescently and regularly (e.g., highly organized laminar flow) over a smoothly polished surface. In embodiments of the invention, the entropy of a fluid at the outlet or a reactor may be increased relative to the entropy of a fluid at the inlet due at least in part to using texturing to promote more fluid mixing at the outlet due to texturing than occurs at the inlet.

Texturing may also be used to affect the entropy of a fluid adjacent to the surface due in part to organization, alignment, or positioning of molecules of the fluid adjacent to the textured surface. Consider for a moment the crystallization of a molten metal. A molten metal near its freezing point may be induced into crystallization by contacting the metal with an interface containing a crystal seed pattern. The crystal seed pattern may comprise a seed of the crystal. Atoms of the molten metal may align with the interface, according to the crystal seed pattern, and solidify. Additional atoms may continue to solidify in this pattern so that the initial crystal seed pattern associated with the interface propagates or extends into away from the initial interface and affects increasingly more of the molten metal.

Investigations by the present inventors indicate that entropy of a fluid may also be affected by a surface adjacent to the fluid. Without wishing to be bound by theory, it is believed that a first thin layer of fluid may pattern itself according to the surface, and a second thin layer of fluid adjacent the first layer of fluid may be affected by the orientation of the fluid in the first thin layer, and so on into the bulk of the fluid. In this way, the surface may affect the long-range order and entropy of the fluid. The texture may increase the probability of alignment according to a particular texture pattern. Some molecules may be unaligned, for example due to kinetic energy, although on average the texture may increase the population of aligned molecules.

In embodiments, a hydrophobic material (e.g., a polymer, PTFE, etc.) may be textured on a portion, but not all, of a hydrophilic surface (e.g., glass, ceramic, etc.) to give a surface that is both physically and chemically heterogeneously textured in order to increase the entropy of the adjacent fluid, for example relative to the entropy of the fluid next to a polished glass surface. In the case of water, the chemical texturing may disrupt the natural alignment or clustering of water molecules due to their polar nature. Some water molecules may be aligned by the hydrophilic surface portions whereas other water molecules may be oppositely aligned by the hydrophobic surface portions. Increasing the entropy of a fluid, for example at the outlet but not at the inlet, may allow influencing and thermodynamically favoring the occurrence of a reaction of interest. Alternatively, a surface at an outlet may comprise a smoothly polished chemically homogeneous material whereas a surface at an inlet may comprise a roughly polished chemically heterogeneous material.

In embodiments of the invention the surface may incorporate a long-range entropy-reducing pattern for a bulk fluid. The pattern may be scratching, lithographically etched, deposited, printed, or otherwise formed on the surface. Suitable patterns include fractal patterns. Relationships between fluid entropy and fractals are known in the arts. For example, U.S. Pat. No. 5,938,333 to M. Kearney discusses a fractal cascade as an alternative to inter-fluid turbulence. Also, see e.g., "A New Kind of Science", by Stephen Wolfram, published by Wolfram Media, Inc., ISBN: 1579550088, May 14, 2002. Also see e.g., "A Fresh Take On Disorder, Or Disorderly Science?", Science, Vol. 297, pp. 1268–1269. The long-range entropy-reducing pattern may organize the bulk fluid within the reactor, over a distance greater than several molecular dimensions away from the surface into the bulk fluid, and may reduce the entropy of the fluid.

It is well known in the arts that water often takes the form of swirling fractal patterns, or slightly imperfect approximations thereof, which are often seen on frosted glass panes, and the like. Such fractal patterns may be used to induce order in an adjacent fluid. A similar pattern may be formed on a surface with a solid material, preferably a material having a similar chemistry to the fluid. As an example, in the case of water, the swirling fractal pattern may be painted, printed, or otherwise formed on a hydrophobic (e.g., polymeric) surface with a hydrophilic material such as glass, ceramic, or the like. Other fractal patterns may also be used. Suitable fractal patterns of relevance for a particular molecule may be readily determined without undue experimentation by those having an ordinary level of skill in the art and the benefit of the present disclosure by freezing a sample of the fluid on a surface and observing a fractal pattern in the frozen sample. The observed fractal pattern may be formed on the surface in order to arrange molecules in a fluid. Fractal patterns may also be determined by simulation.

Electron transport through a medium and the entropy of the medium are related. It is well known that good electron transport is achieved in highly organized solid materials and crystals at low temperature. This has been demonstrated through electrical resistance, superconductivity, etc.

The present inventors have discovered another approach for producing a substantially low-entropy, organized fluid within a reactor, such as an electrochemical reactor, that involves contacting the fluid with a surface containing a pattern sufficient to cause a long-range order within the proximate fluid abutting the interface. By long-range order it is meant that the order extends at least more than several molecular dimensions into the fluid, for example greater than approximately a millimeter, or more.

Experiments by the present inventors indicate that typical conversions in electrolysis of water may be obtained without adding salt or other electrolytes to the input water to increase conductivity. The addition of these salts or electrolytes has heretofore been needed in order to increase the conductivity of the water. The elimination of the salt is an omission of an element from the previous electrolyzers, thereby making the systems and methods simpler, without loss of functionality for producing electrolyzed water. The elimination of the salt may reduce the costs and complexities of electrolyzing water and may avoid needing to separate the salt from the water at some later point.

Figure 12:
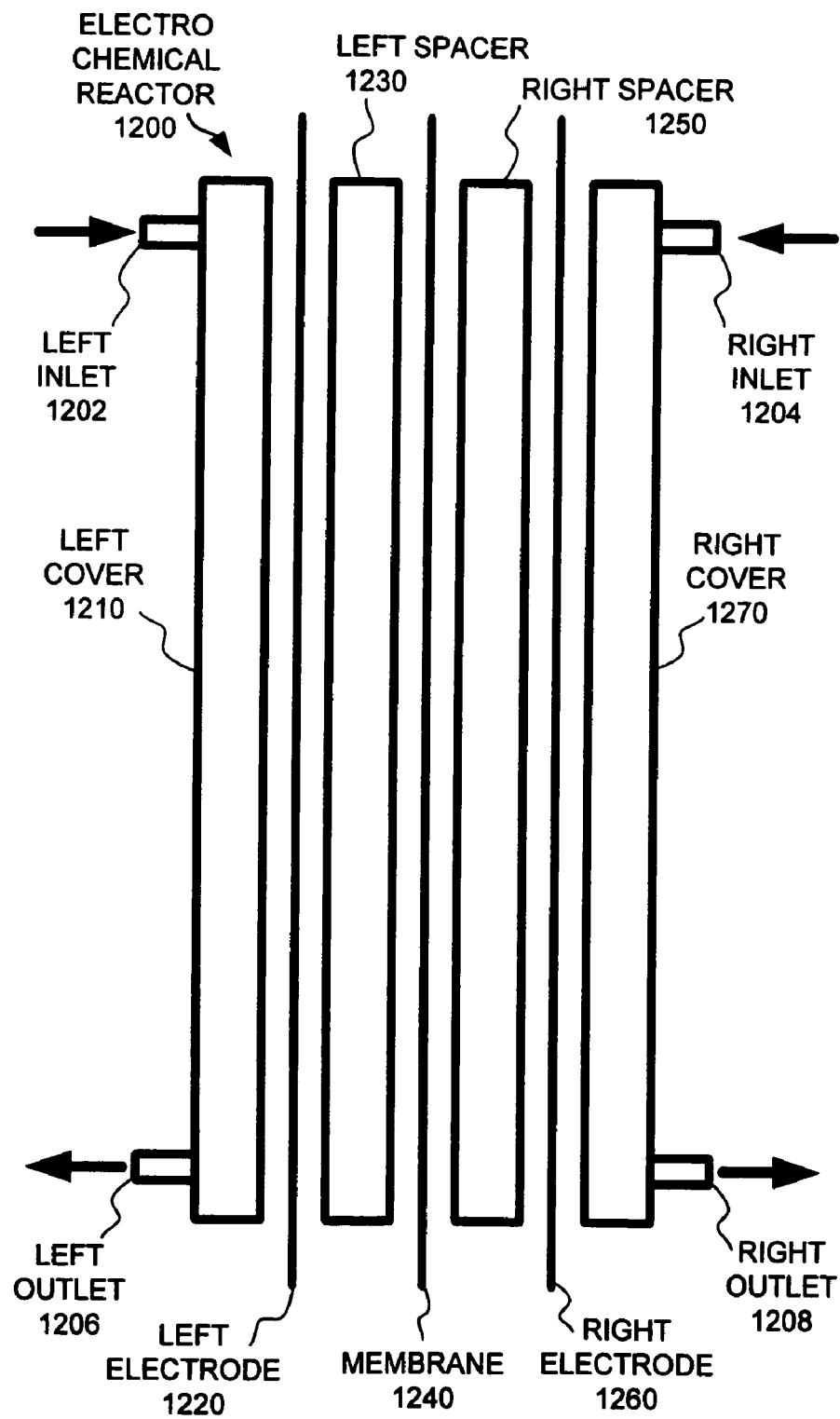
FIG. 12 shows an electrochemical reactor, according to embodiments of the invention.

FIG. 12 shows an electrochemical reactor 1200, according to embodiments of the invention. The reactor contains a left cover 1210, a left electrode 1220, a left spacer 1230, a membrane 1240, a right spacer 1250, a right electrode 1260, a right cover 1270, a left inlet 1202, a right inlet 1204, a left outlet 1206, and a right outlet 1208. To better illustrate the concepts the reactor is shown in partially exploded view with separation between the covers, spacers, electrodes, and membrane, although it is to be appreciated that these components may be connected and sealed using approaches conventionally used in the arts so that the reactor is fluid tight. For example, bolts, glue, screws, and other fasters may be used. As desired, silicon rubber, polytetrafluoroethylene tape, and other approaches may be used to seal the reactor. Reactants or other fluids may be added through the inlets, may flow through the electrodes, may flow through the spacers, may be electrochemically processed by the electrodes and the membrane, and may be removed through the outlets. The electrodes may comprise permeable electrodes in the form of woven metal cloth, screens, mesh, wires, porous metal, or the like, to allow fluid to permeate or flow through them. The spacers may comprise a porous medium (e.g., packing, fiberglass, porous ceramic, etc.) or more desirably a fluid flow channel. Examples of suitable spacers include but are not limited to those shown in FIGS. 14–16.

Figure 13:
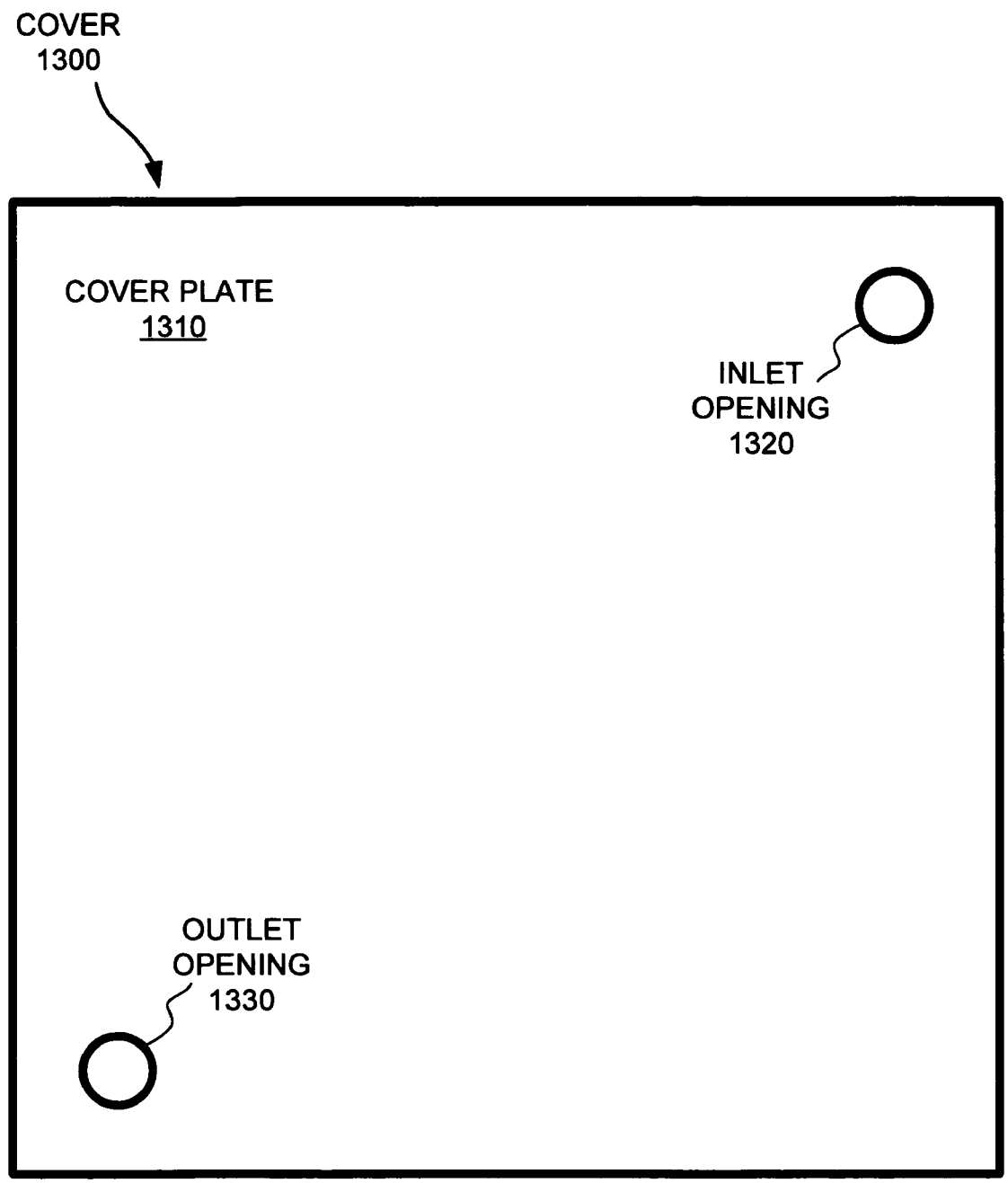
FIG. 13 shows a cover, according to embodiments of the invention.

FIG. 13 shows a cover 1300, according to embodiments of the invention. The cover contains a cover plate 1310 having an inlet opening 1320 and an outlet opening 1330 formed therein. The cover plate may comprise a solid material such as a plastic, metal, ceramic, wood, or the like. The illustrated cover plate is substantially square although this is not required and the cover plate may have any desired shape. The cover sheet has the openings formed therein. The illustrated cover plate has the inlet opening at the top right corner and the outlet opening at the bottom left corner, although this is not required and any other configuration of inlet and outlet openings may be used. The openings may be formed in the plate by machining, drilling, cutting, punching, or other approaches known in the arts. They may be circular, square, rectangular, slits, or other shapes. In an alternate embodiment (not shown), a corresponding channel, groove, or depression may be formed in the cover, not all the way through the cover, corresponding to the serpentine fluid flow channel patterns shown in FIGS. 14–16. In this way, these channels in the cover may allow fluid on the opposite side of the electrode as the membrane, as discussed in FIG. 7.

Figure 14:
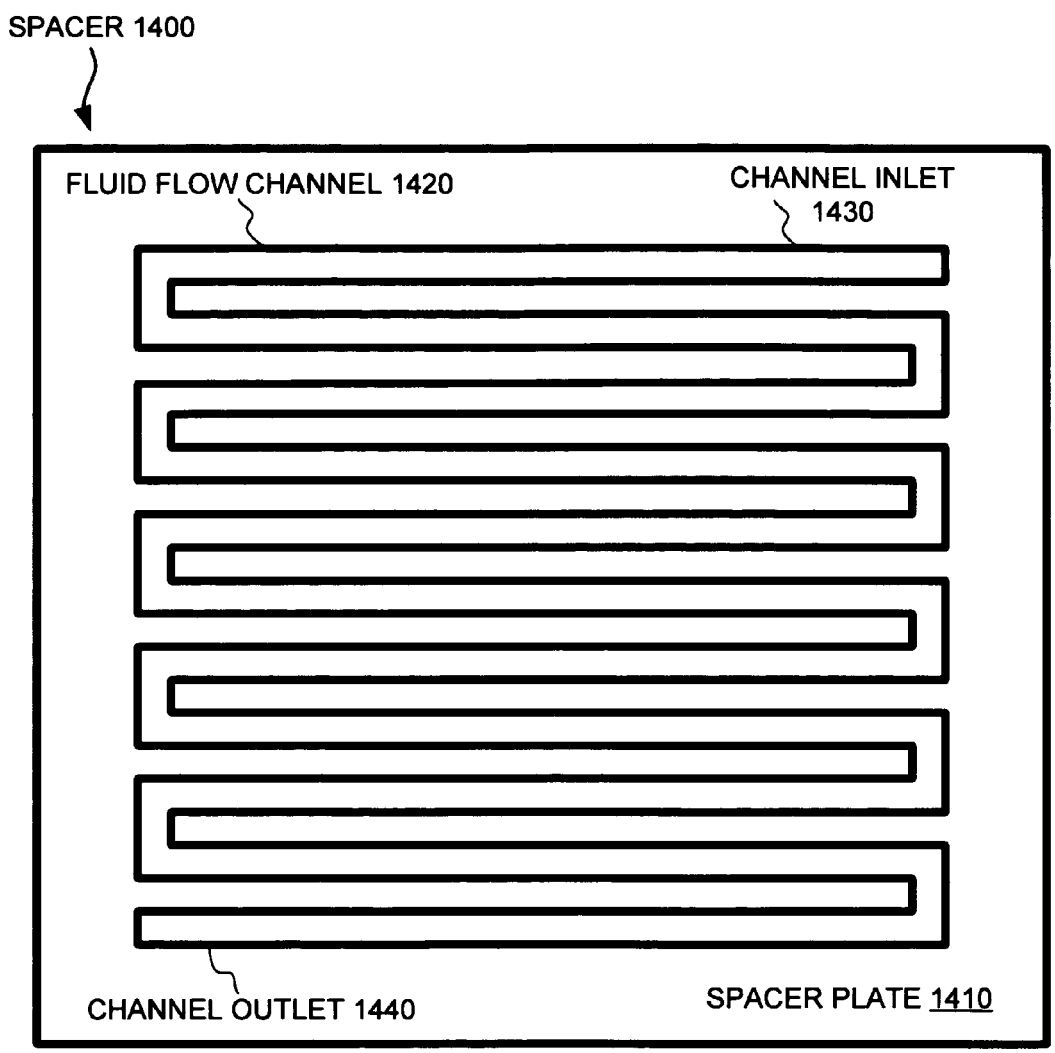
FIG. 14 shows a spacer, according to embodiments of the invention.

FIG. 14 shows a spacer 1400, according to embodiments of the invention. The spacer contains a spacer plate 1410 having a fluid flow channel 1420 formed therein. The spacer plate may comprise a non-electrically conductive material such as wood, plastic, ceramic, or the like. Desirably, the material is chemically inert and cost effective. The thickness of the spacer plate may be relatively thin, for example ¼", ¾", or ⅟₁₆", in order to provide a relatively high electrical gradient in the fluid between the electrodes separated by the plate. The fluid flow channel has a channel inlet 1430 and a channel outlet 1440. The fluid flow channel is serpentine and connects the inlet and the outlet. The channel may be formed by cutting (e.g., with a saw), molding, embossing, and other approaches known in the art. The length of the channel allows the electrochemical reactor to have characteristics approaching those of a plug flow reactor, as opposed to a stirred tank reactor. This may offer a number of advantages known in the arts. A fluid entering the channel inlet may flow through the long and tortuous serpentine path of the channel, in proximity of the adjacent membrane and electrode, and may be electrochemically processed.

Figure 15:
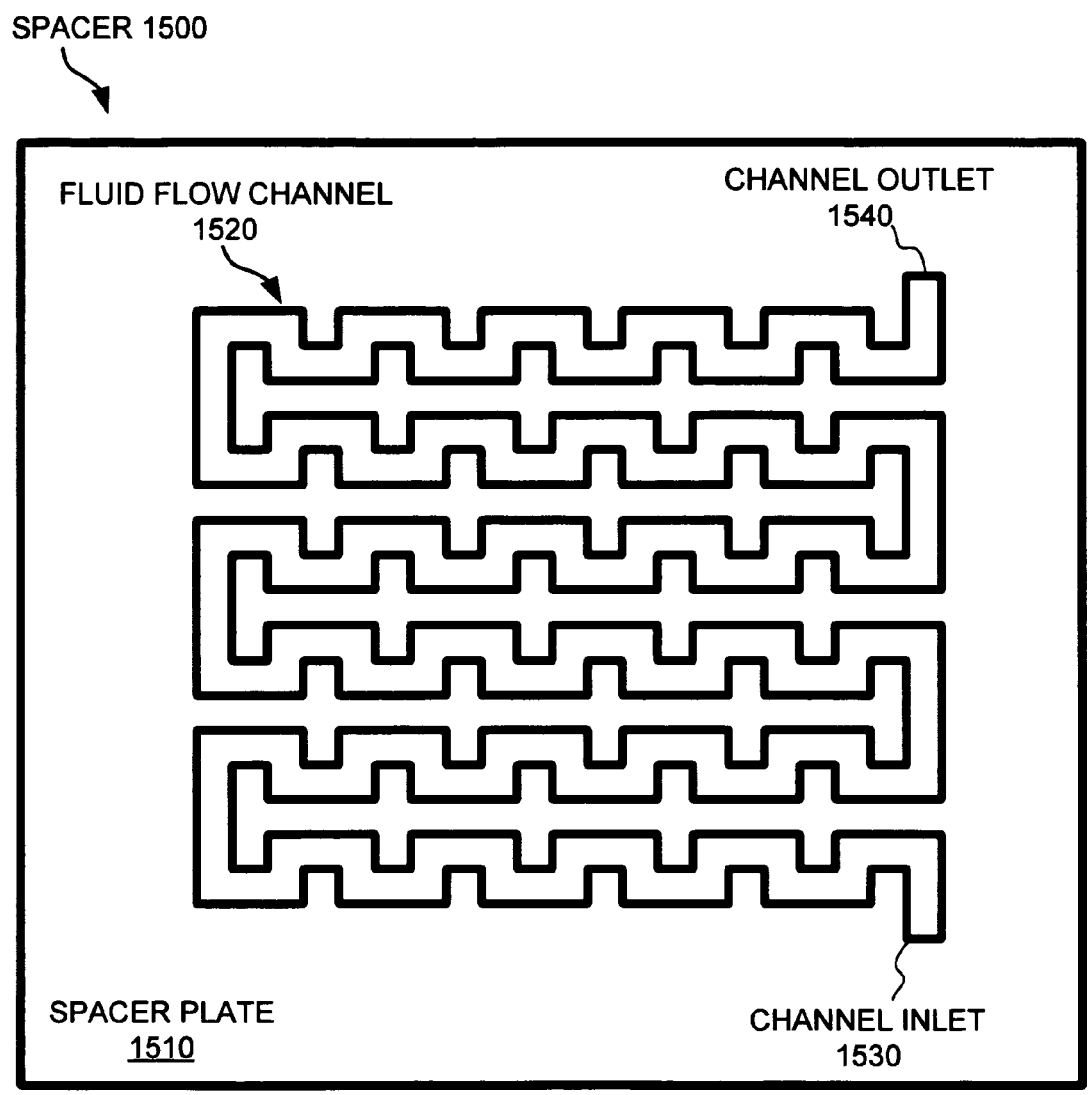
FIG. 15 shows a spacer, according to other embodiments of the invention.

FIG. 15 shows a spacer 1500, according to embodiments of the invention. The spacer contains a spacer plate 1510 having a fluid flow channel 1520 formed therein. The fluid flow channel has a channel inlet 1530 and a channel outlet 1540. The fluid flow path is serpentine and contains smaller secondary turns as well as larger primary turns within the plate. The secondary turns add length and directional change to the fluid within the channel. The directional change may be useful for providing increased mixing, turbulence, and entropy.

Figure 16:
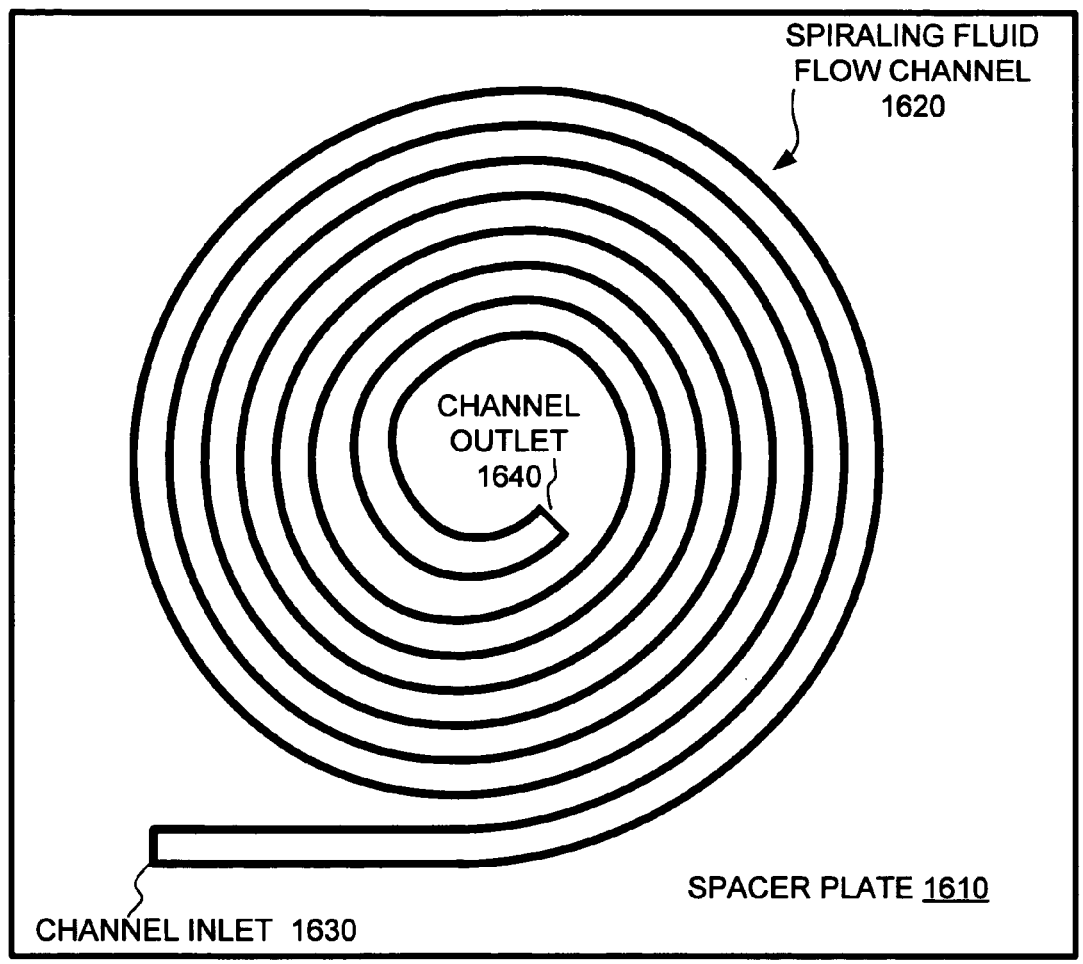
FIG. 16 shows a spacer, according to still other embodiments of the invention.

FIG. 16 shows a spacer 1600, according to embodiments of the invention. The spacer contains a spacer plate 1610 having a fluid flow channel 1620 formed therein. The fluid flow channel has a channel inlet 1630 and a channel outlet 1640. The fluid flow channel is serpentine and spiraling. The spiraling fluid flow channel has a smaller spiraling radius at the outlet than at the inlet. As previously described, the fluid flow mixing/entropy may be greater at the outlet than at the inlet. In an alternate embodiment of the invention the inlet may be located at the inner center of the spiral. A texture may be placed on any of the surfaces of the spacer plates in order to entropically affect the adjacent fluid, as previously discussed.

Electrolyzed water may be synthesized in electrochemical reactors as previously described. Certain aspects of functional fluid are described in U.S. Pat. No. 5,997,717, entitled, "Electrolyzed Functional Water, and Production Process and Production Apparatus Thereof", which is hereby entirely incorporated by reference. Investigations by the present inventors indicate that the electrolyzed water synthesized in these reactors may contain clusters of water aligned based on their dipoles.

Figure 17:
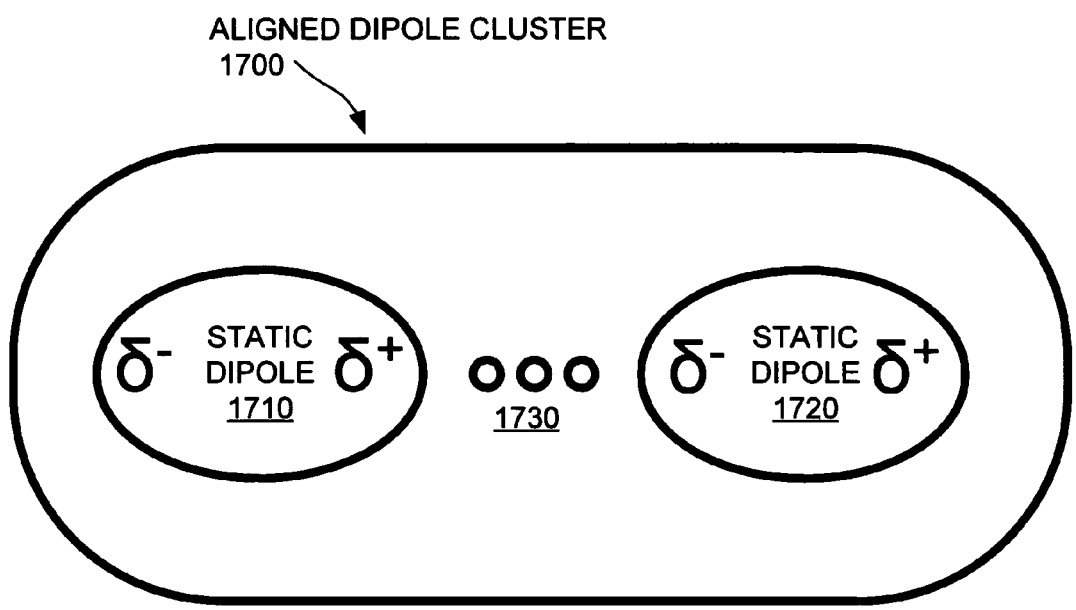
FIG. 17 shows an aligned dipole cluster, according to embodiments of the invention.

FIG. 17 shows an aligned dipole cluster 1700, according to embodiments of the invention. The aligned cluster will be used to refer to a plurality of polar or polar induced molecules having their poles or induced poles aligned. The aligned cluster contains a first static dipole 1710, a second static dipole 1720 aligned relative to the first, and any desired number of additional aligned static dipoles 1730. According to one embodiment the reactor may be used with an aligned dipole cluster of molecules. According to one embodiment the aligned dipole cluster comprises water, which has a permanent native dipole, which may also be increased by inducement. Water molecules can be induced to arrange in order to develop an aligned cluster.

Figure 18:
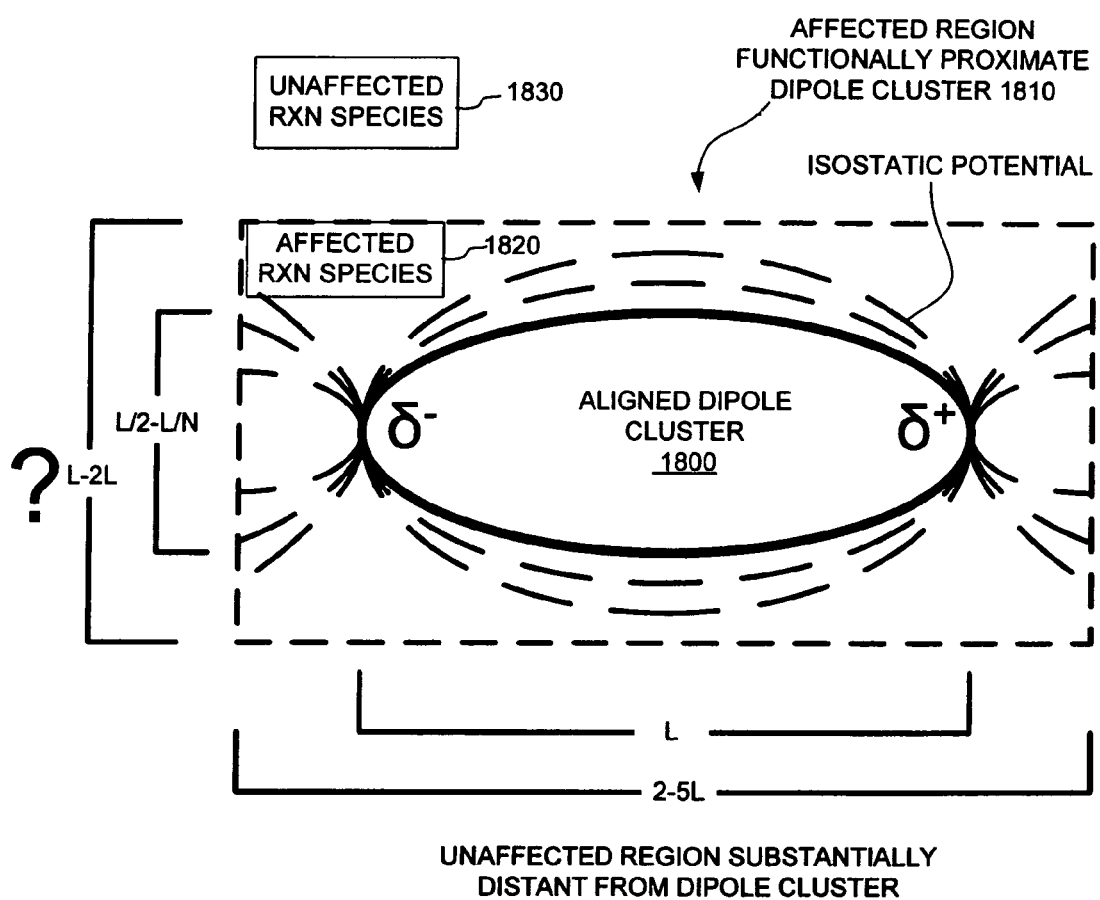
FIG. 18 shows an aligned dipole cluster and isostatic potential or electrostatic lines of force, according to embodiments of the invention.

FIG. 18 shows an aligned dipole cluster 1800 and isostatic potential or electrostatic lines of force, according to embodiments of the invention. Clusters exhibit electrostatic lines of force. The electrostatic lines of force define an affected region 1810 functionally proximate the dipole cluster. A reaction species 1820 within the region may be affected whereas a reaction species 1830 outside the region may be substantially unaffected. The cluster has length represented by L. The length of the affected region may be in the range of approximately two to five times L. The width of the affected region may be in the range of approximately L to two times L.

Figure 19:
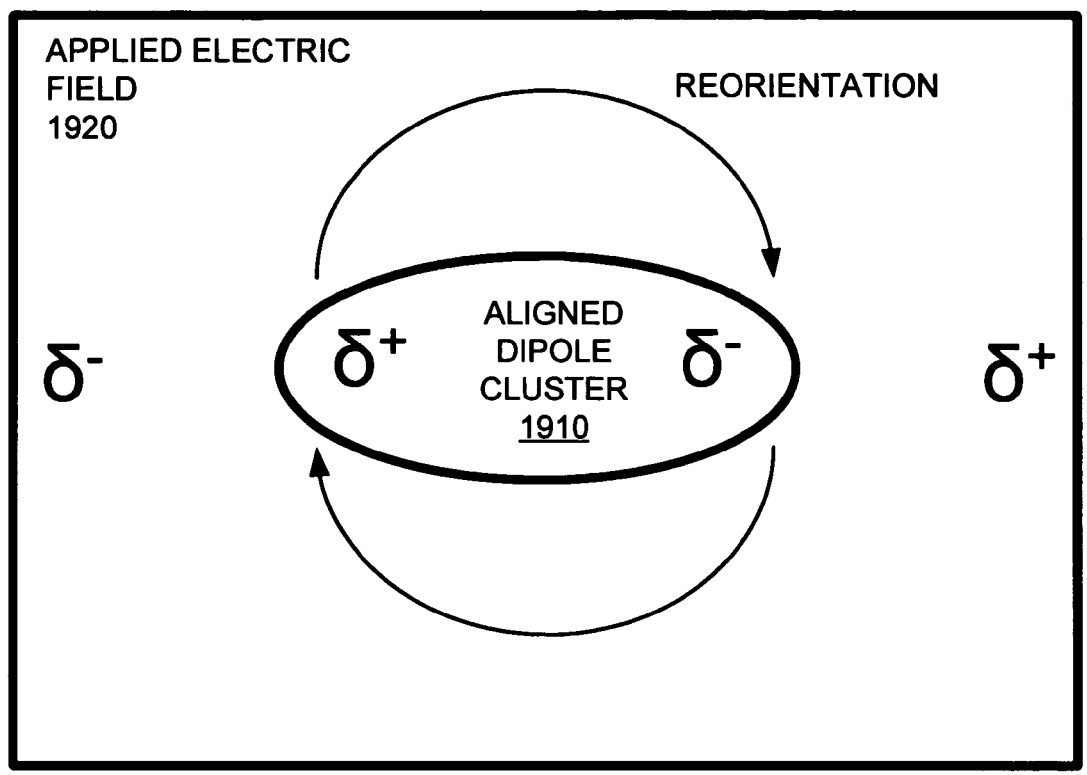
FIG. 19 shows an aligned dipole cluster in an applied electric field, according to embodiments of the invention.

Forms of energy that may be used to affect aligned dipole clusters include thermodynamic, mechanical, gravity, electrostatic, electromagnetic radiation, electromagnetic, biological, acoustic, chemical, and fluid dynamic. Clusters may change their orientation under the influence of an electrostatic field. FIG. 19 shows an aligned dipole cluster 1910 in an applied electric field 1920, according to embodiments of the invention. If the cluster is improperly oriented it may undergo a reorientation so that it is properly aligned, as shown. As an example, clusters may be aligned by applying an electric field, for example by introducing them between charged plates. An aligned dipole cluster, and in one embodiment an aligned dipole cluster of water, may exhibit specific macroscopic parameters. The cluster may have a type and concentration of hydrophilic and hydrophobic molecules and dissolved gases, a pH, an oxidation-reduction potential, a conductivity, etc.

Clusters may be combined to create fluids having many desirable properties and uses. Aligned dipole clusters may have properties including but not limited to: (1) carrying information in the various distributions of water clusters with the right combination of above macroscopic parameter; (2) formation of meta-stable compounds that also can maintain potential energy (electron surplus/deficiency); (3) having the ability to create hydrogen, oxygen, proton and/or electron "cages"; and (4) providing stable zeta potential to reduce steric hindrance in some reactions. In methods according to embodiments of the invention, aligned dipole clusters may be used for a variety of purposes including but not limited to physical processes, chemical processes, and biological processes. Physical processes include but are not limited to reducing a solutions surface tension, exhibiting surfactant like behavior, providing nucleation sites for solutions, and providing descaling and cleaning. Chemical processes include but are not limited to increasing the density of reactants, increasing the rates of reactants velocities, catalyzing effects through out the volume, enhancing combustion, and reducing coke formation in ethylene production. Biological processes include but are not limited to surrounding and affecting an enzyme, regulating enzymatic activities, acting as harmless antigens in the body, and stimulating immune responses to infection.

It is an aspect of embodiments of the invention that one or more design parameters of a reactor be determined based on the characteristics of one or more molecules. According to embodiments of the invention the reactor may have design characteristics or features that utilize thermodynamics to improve the conversion obtained for a particular reaction. As one example, for a molecule having a particular shape and structure, and the associated vibratory and other characteristics, an energy input for the reactor, such as a waveform energy like electromagnetic radiation, sonic energy, or the like, may be determined in order to favor the formation of the molecule.

Figure 20:
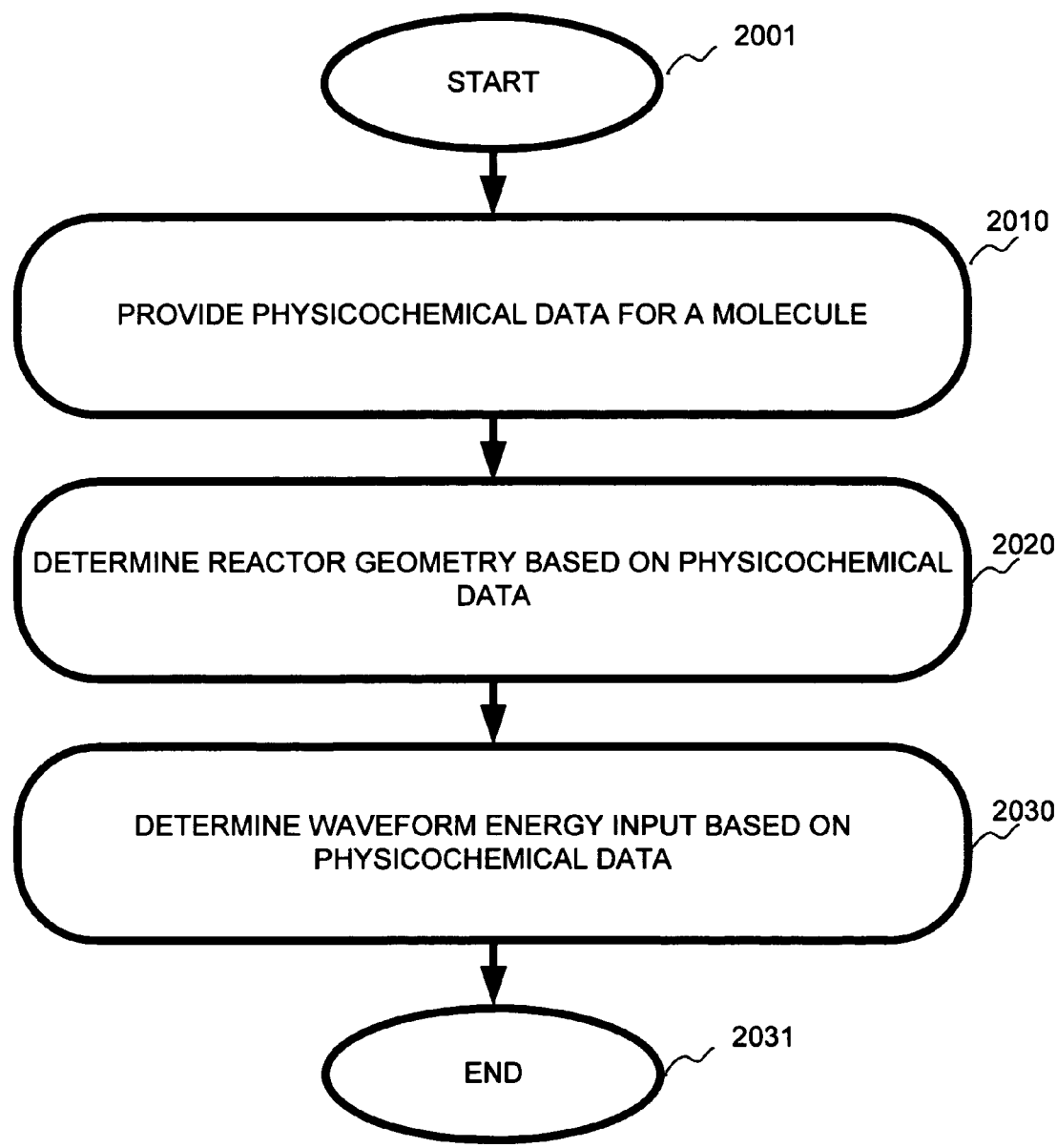
FIG. 20 shows a method for determining reactor design parameters, according to embodiments of the invention.
Figure 21:
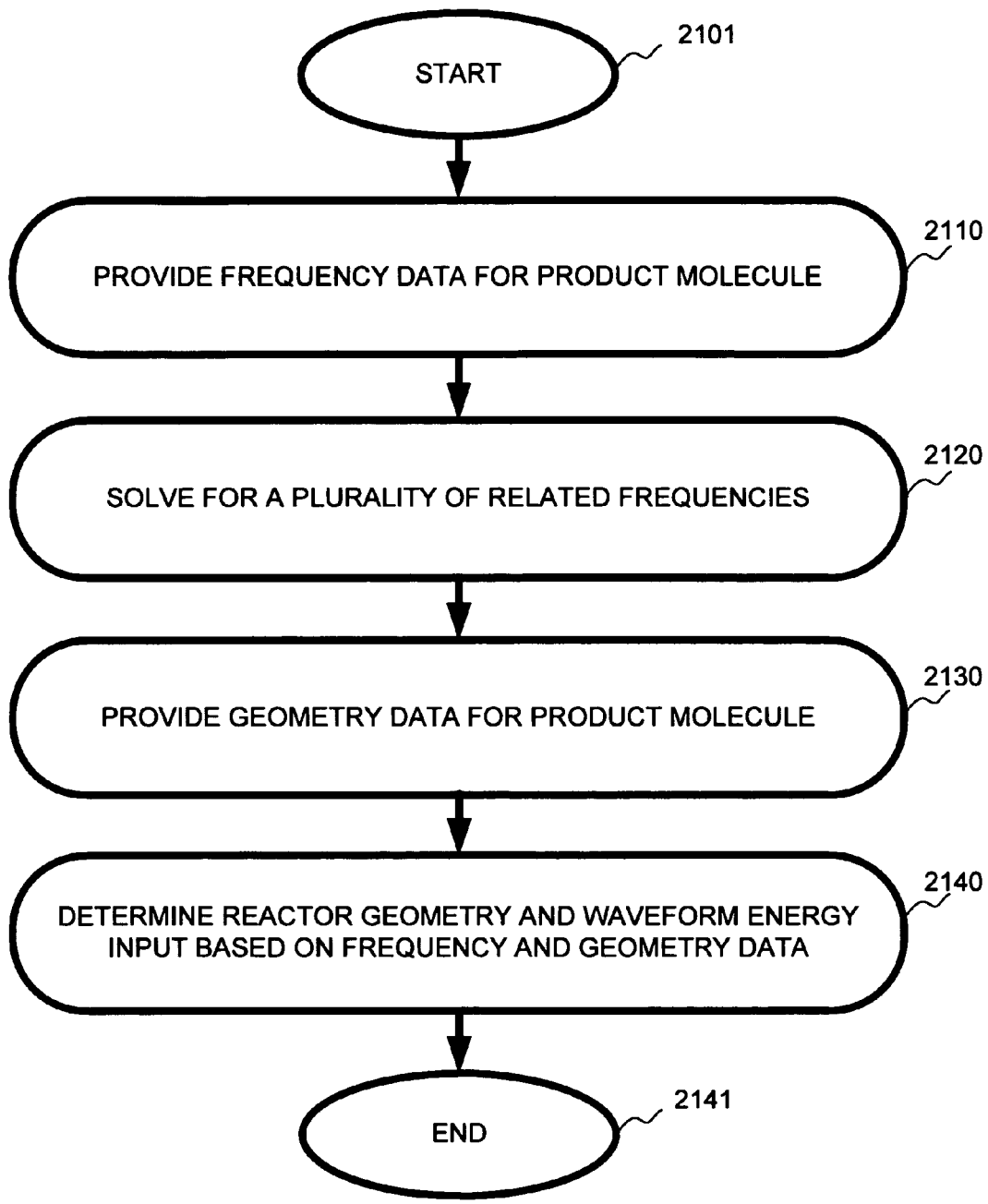
FIG. 21 shows a method for determining reactor geometry and waveform energy input based on geometry and frequency data for a product molecule, according to embodiments of the invention.

FIGS. 20–21 show determining reactor design parameters, according to embodiments of the invention. The methodology may be used to analyze and design a dynamic fluid reactor. A method 2000 for determining reactor design parameters based on physicochemical parameters of a reaction chemical species or molecule initiates at block 2001. After initiating, physicochemical data for a molecule is provided at block 2010. The molecule may be any molecule including organic and inorganic molecules, proteins, pharmaceuticals, aligned dipole clusters, aligned water clusters, and other molecules and groups of molecules that are desired for the particular implementation. The parameters may likewise be any measurable physical or chemical parameter of the molecules including but not limited to size, shape, polarity, steric properties, electrical properties bond strengths, intermolecular forces and other physiochemical parameters. In one case spectroscopy data is a physiochemical parameter. The spectroscopy data may qualitatively or quantitatively represent molecular forces such as bond strengths, bond distances, intermolecular forces, and other parameters that are known to affect spectroscopy data for molecules and groups of molecules. Next, at block 2020 reactor geometry is determined based on the physicochemical data for the molecule. Then, at block 2030 waveform energy is determined based on the physicochemical data. The method may terminate at block 2031.

In embodiments of the invention a reactor may be designed based on quantum mechanical parameters for one or more molecules. An exemplary embodiment will be described in greater detail, although those having an ordinary level of skill in the art and the benefit of the present disclosure will appreciate that the invention is not limited to such an embodiment and will appreciate that many other embodiments are contemplated. Measurements may include determinations and approximations of energy, matter and information. These parameters may be represented using a parameter known in the arts as $R_6$. $R_6$ is described in Strukturen der physikalischen Welt und ihrer nichtmateriellen Seite (Structure of the Physical Universe and its Non-physical Side), Walter Dröscher-Burkhard Heim Resch Verlag-Innsbruck, 1996, 163+16 S.; ISBN 3-85 382-059-X, which is hereby incorporated in entirety by reference.

$R_6$ comprises three physical dimensions $x^1$, $x^2$, $x^3$, time dimension $x^4 = i*c*t$ (square root of minus one, times the speed of light, times time) and two non-physical dimensions $x^5$ and $x^6$. Solutions for matter in all six dimensions yields continuous spectra. Discontinuities occur when the solutions inclusive of $x^5$ and $x^6$ are not included. The frequencies and spectra referred to below may not be continuous. Assumptions and approximations may be varied, depending on the phases solid, liquid and gas each of which has characteristic parameters in $R_6$ corresponding to flow of ions, electrons and molecules as well as inter/intramolecular forces and intrinsic information.

A method according to embodiments of the invention may include identifying a frequency group associated with a molecule, creating solutions that are periodic with the frequency group, identifying the target geometry in $R_6$, and determining reaction parameters that are conducive to formation of the desired target molecule using various waveforms and duty cycles as well as reactor geometries based on the frequency group and geometry.

FIG. 21 shows a method 2100 for determining reactor geometry and waveform energy input based on geometry and frequency data for a product molecule, according to embodiments of the invention. After initiating at block 2101, frequency data is provided for a target molecule at block 2110. A target species frequency group may be identified. In one embodiment this may be done by using a technique that uses spectroscopic wavelength of target molecule and divides it by the speed of light.

Next, a plurality of related frequencies are solved for at block 2120. Three basic solutions may be created based on the target frequencies that are periodic with the above frequencies. In one embodiment this may be done using frequencies that resonate at: 1) greater than mass of target, 2) at mass of target, or 3) less than mass of target. One method includes the use of Jacobson Resonant Frequency formulae that is described in U.S. Pat. No. 6,004,257, entitled "Method for Ameliorating the Aging Process and the Affects Thereof Utilizing Electromagnetic Energy", which is hereby entirely incorporated by reference. The Jacobson formula may be represented by $f_c=(q*B)/(2*\pi*m)$, and $m*c^2=B*v*l*q$, where m is the mass traveling with the earth, $c^2$ is the speed of light squared, B is magnetic flux, v is the inertial velocity of the mass contained in length l traveling with the earth, of the conductive body and q is the charge taken as unity. Bandwidths about resonant frequency typically vary from 1–10% of the target frequency.

Then, geometry data is provided for the target molecule at block 2130. The target geometry may be identified in $R_6$. In one embodiment the geometry comprises electronic, nuclear, or both electronic and nuclear configurations and symmetry of the target.

Next, a reactor geometry and a waveform energy input are determined based on the frequency and geometry data at block 2140. Based on the physicochemical data, including the frequency and geometry information, reaction parameters and reaction environment may be determined that are conducive to formation of the desired target using various waveforms and duty cycles as well as reactor geometries. Reactor geometries include, but are not limited to helical, circular, ellipsoidal and cylindrical. The reactor geometry also may include position of the inlet relative to the outlet. For example, consider without limitation density changing reaction, in this case the inlet and outlet geometry, including whether the inlet is elevated above the outlet or the reverse, may be determined so that gravity and a difference in density changing hydrostatic head between the inlet and the outlet thermodynamically favor reaction products. Waves may be sonic or electromagnetic, scalar or manifest and delivered continuously, in wavelets or solutions. Waveforms include, but are not limited to: square, sinusoidal, saw tooth, elliptic, and hyperbolic. The target solution is a superposition of the above three factors: frequency, waveform and reactor geometry. The method terminates at block 2141.

Figure 22:
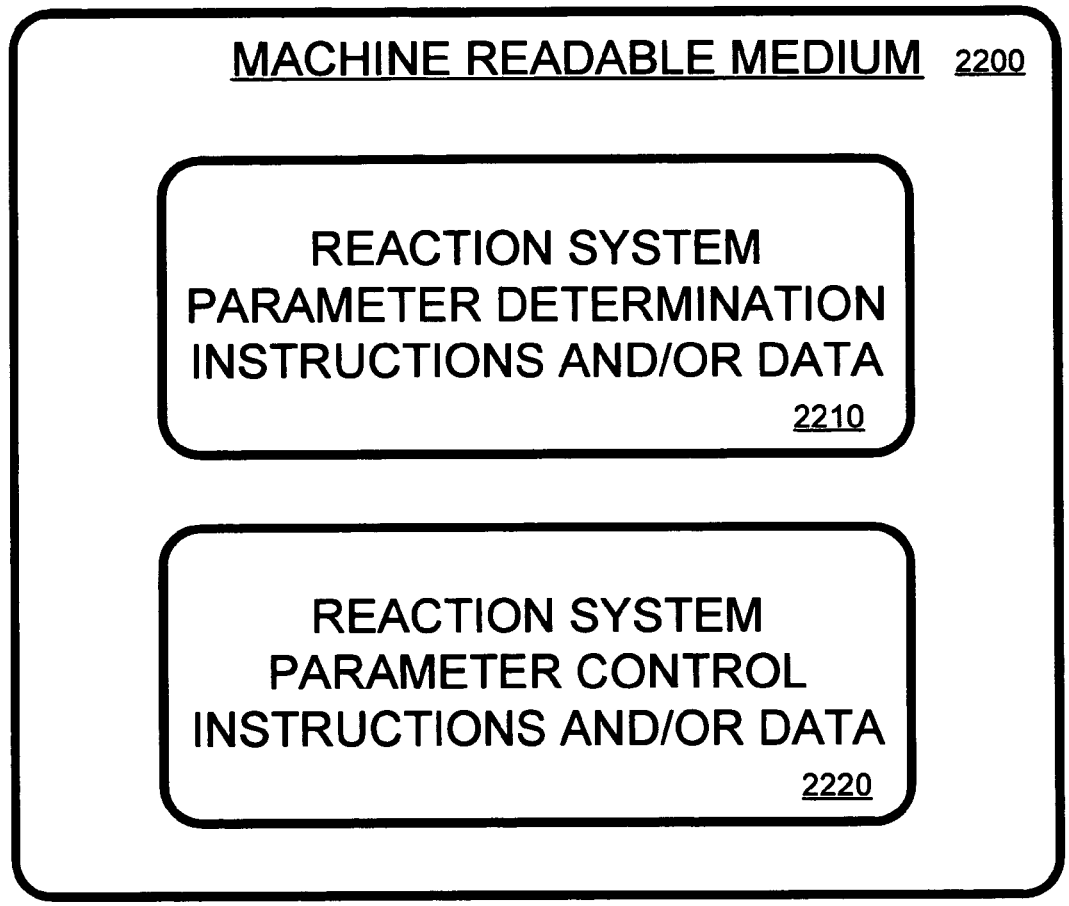
FIG. 22 shows a machine-readable medium that contains reaction system parameter determination instructions and/or data and reaction system parameter control instructions and/or data, according to embodiments of the invention.

FIG. 22 shows a machine-readable medium 2200 that contains reaction system parameter determination instructions and/or data 2210 and reaction system parameter control instructions and/or data, according to embodiments of the invention. Embodiments of the invention may include various operations, as described above. The operations of the present invention may be performed by hardware components or may be embodied in machine-executable instructions, which may be used to cause a general-purpose or special-purpose processor or logic circuits programmed with the instructions to perform the operations. The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection). Alternatively, the operations may be performed by a combination of hardware and software.

Figure 23:
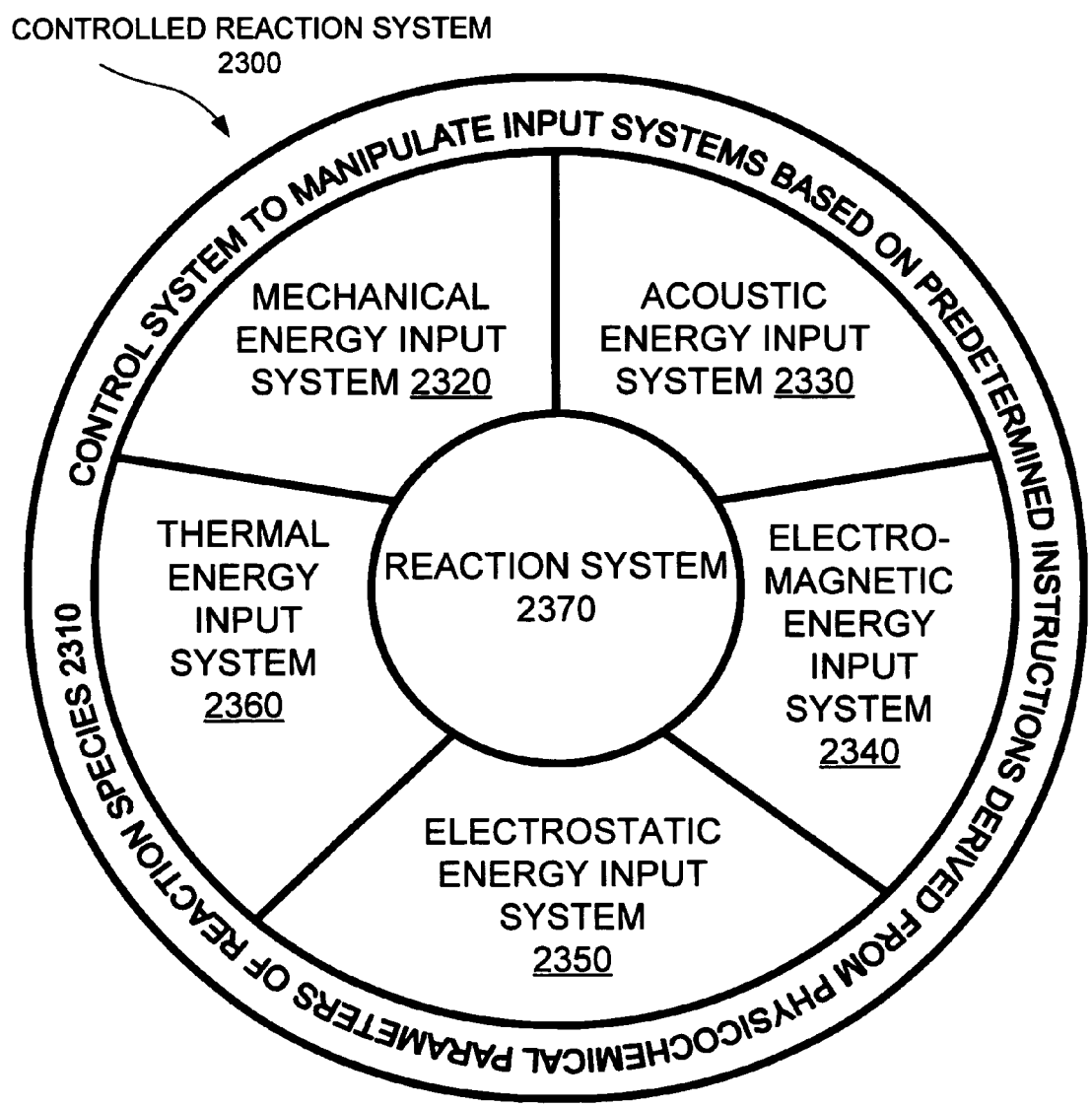
FIG. 23 shows a controlled reaction system in which a reactor as described herein may be employed, according to embodiments of the invention.

FIG. 23 shows a controlled reaction system 2300 in which a reactor as described herein may be employed, according to embodiments of the invention. The system includes a control system 2310 to manipulate input systems based on predetermined instructions derived from physicochemical parameters of reaction species. The system also includes a variety of input systems manipulated by the control system. The input systems include a mechanical energy input system 2320, an acoustic energy input system 2330, an electromagnetic energy input system 2340, an electrostatic energy input system 2350, and a thermal energy input system 2360. The input systems provide input to a reaction system 2370 under the control of the control system. The reaction system may include one of the reactors described elsewhere herein. In this way a controlled reaction system may be achieved, according to embodiments of the invention.

Figure 24:
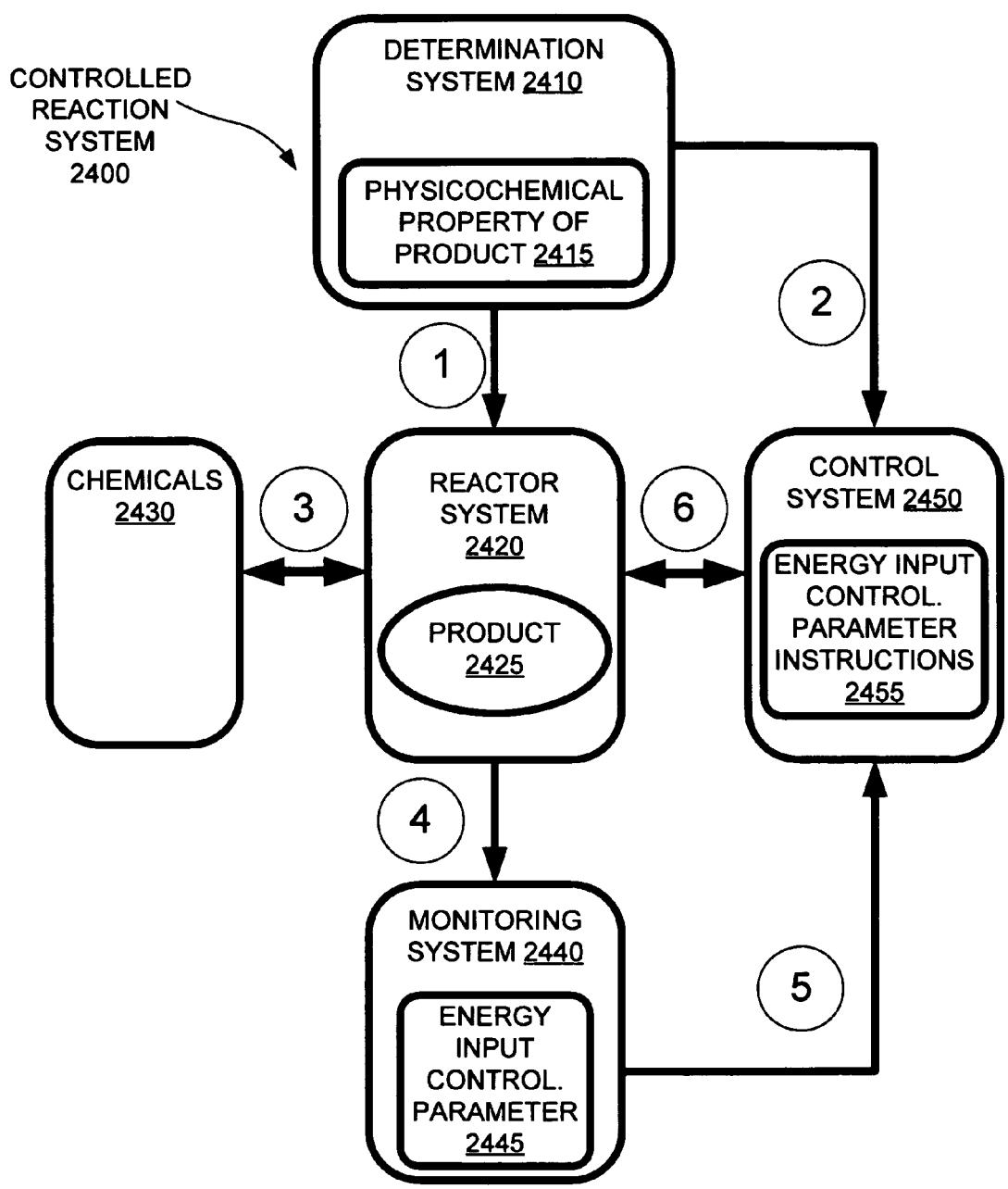
FIG. 24 shows a controlled reaction system, according to embodiments of the invention.

FIG. 24 shows a controlled reaction system 2400, according to embodiments of the invention. The system includes a determination system 2410 having a physicochemical property of a product 2415, a reactor system 2420 having a product 2425, chemicals 2430 (e.g., products and reactants), a monitoring system 2440 having an energy input control parameter 2445, and a control system 2450 having an energy input control parameter instructions. The reactor system may include one of the reactors described elsewhere herein. Initially, the physicochemical property of the product determined by the determination system may be used to design the reactor system. The physicochemical property may also be supplied to the control system. Next, the chemicals may be added to the reaction system and the product may be formed. During formation of the product the monitoring system may monitor the reaction system and determine the energy input control parameter. This control parameter may be supplied to the control system. The control system may control the reaction system according to the energy input instructions received from the determination system and the control parameter received from the monitoring system. In this way a controlled reaction system may be achieved in order to improve reactive conversion of chemicals to product, according to embodiments of the invention.

Figure 25:
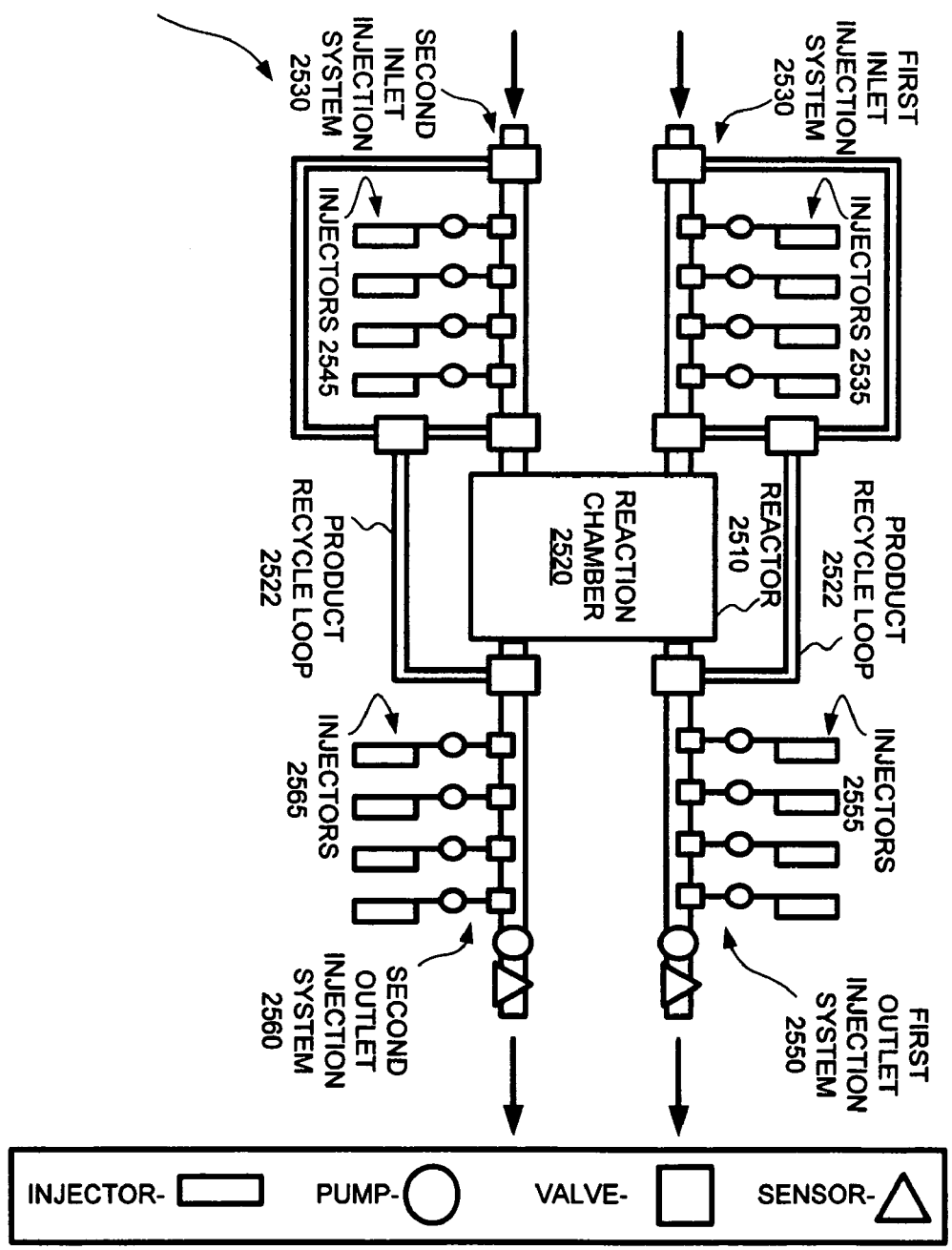
FIG. 25 shows a controlled reaction system, according to other embodiments of the invention.

FIG. 25 shows a reaction system 2500, according to embodiments of the invention. The reaction system includes a reactor 2510 having a reaction chamber 2520, such as a fluid flow channel as described herein, in which a reaction is carried out. The system also includes a first inlet injection system 2530 having injectors 2535, a second inlet injection system 2540 having injectors 2545, a first outlet injection system 2550 having injectors 2555, and a second outlet injection system 2560 having injectors 2565. Each of the injection systems may include flow lines, injectors, pumps, and valves. The outlet injection systems may include sensors. A first product recycle loop 2522 and a second product recycle loop 2524 may be used to recycle any desired flow of product from the outlet of the reactor 2510 to the inlet of the reactor. The recycle loops may be used to return some of the product fluid mixture at the outlet of the reactor to the inlet. The product fluid mixture may contain a cluster, precipitate, crystal, or the like that may serve as a pattern which may assist the reactant fluids in converting to product. The recycle may be useful for facilitating the reaction.

Figure 26:
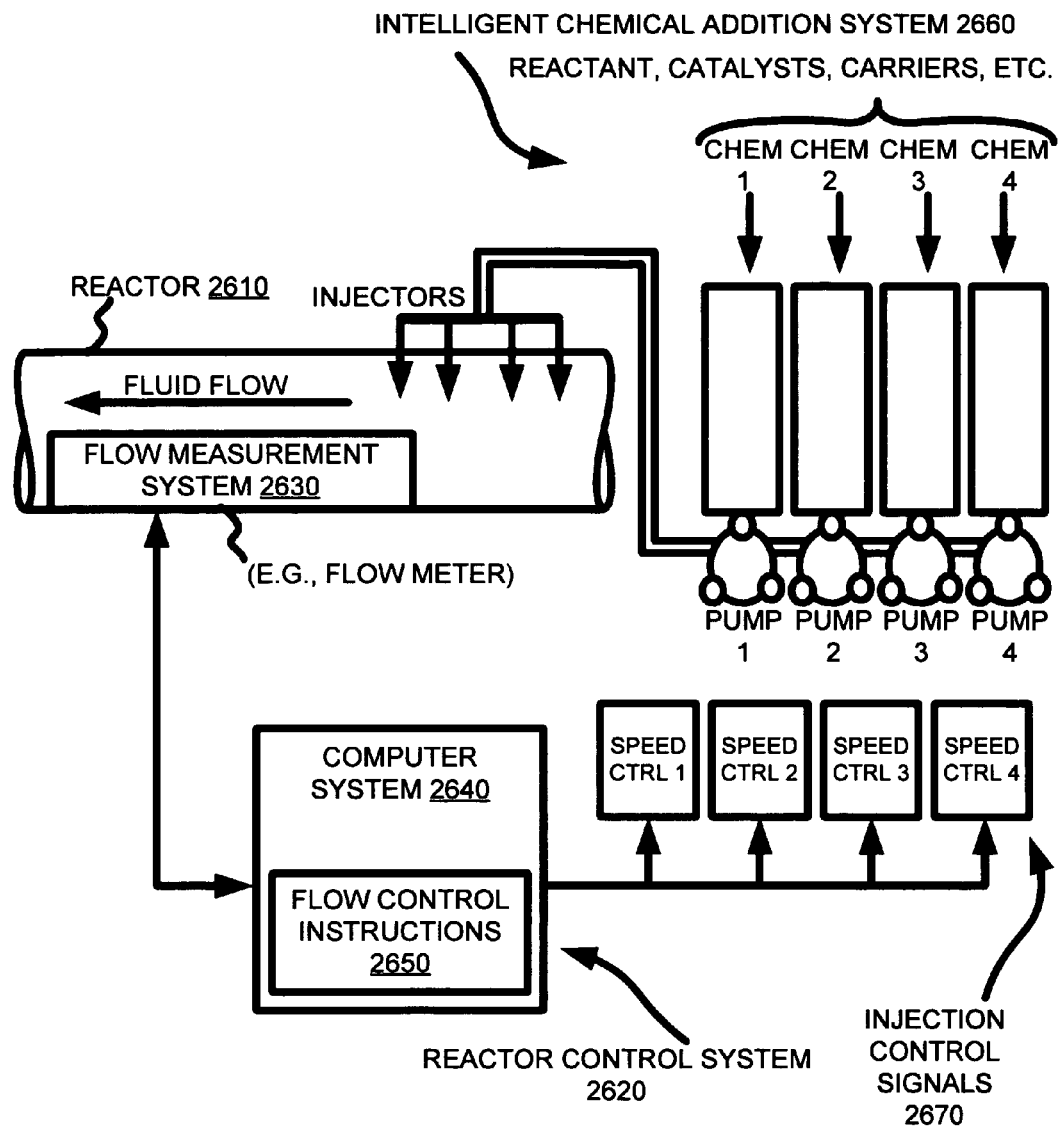
FIG. 26 shows a reactor and a reactor control system, according to embodiments of the invention.

FIG. 26 shows a reactor 2610 and a reactor control system 2620, according to embodiments of the invention. The reactor system may include one of the reactors described elsewhere herein. The reactor has a fluid flow in which a reaction takes place. The control system includes a flow measurement system 2630, a computer system 2640 having flow control instructions 2650, and an intelligent chemical addition system 2660. The flow measurement system 2630, for example a flow meter, makes a measurement of flow in the reactor and provides the signal to the computer system. The computer system applies the instructions to the measurement value and supplies injection control signals to the intelligent chemical addition system. The illustrated addition system includes speed-controlled pumps supplying a plurality of chemicals to the reactor through injectors, although this is not required. In this way the reactor may be controlled according to embodiments of the invention.

Figure 27:
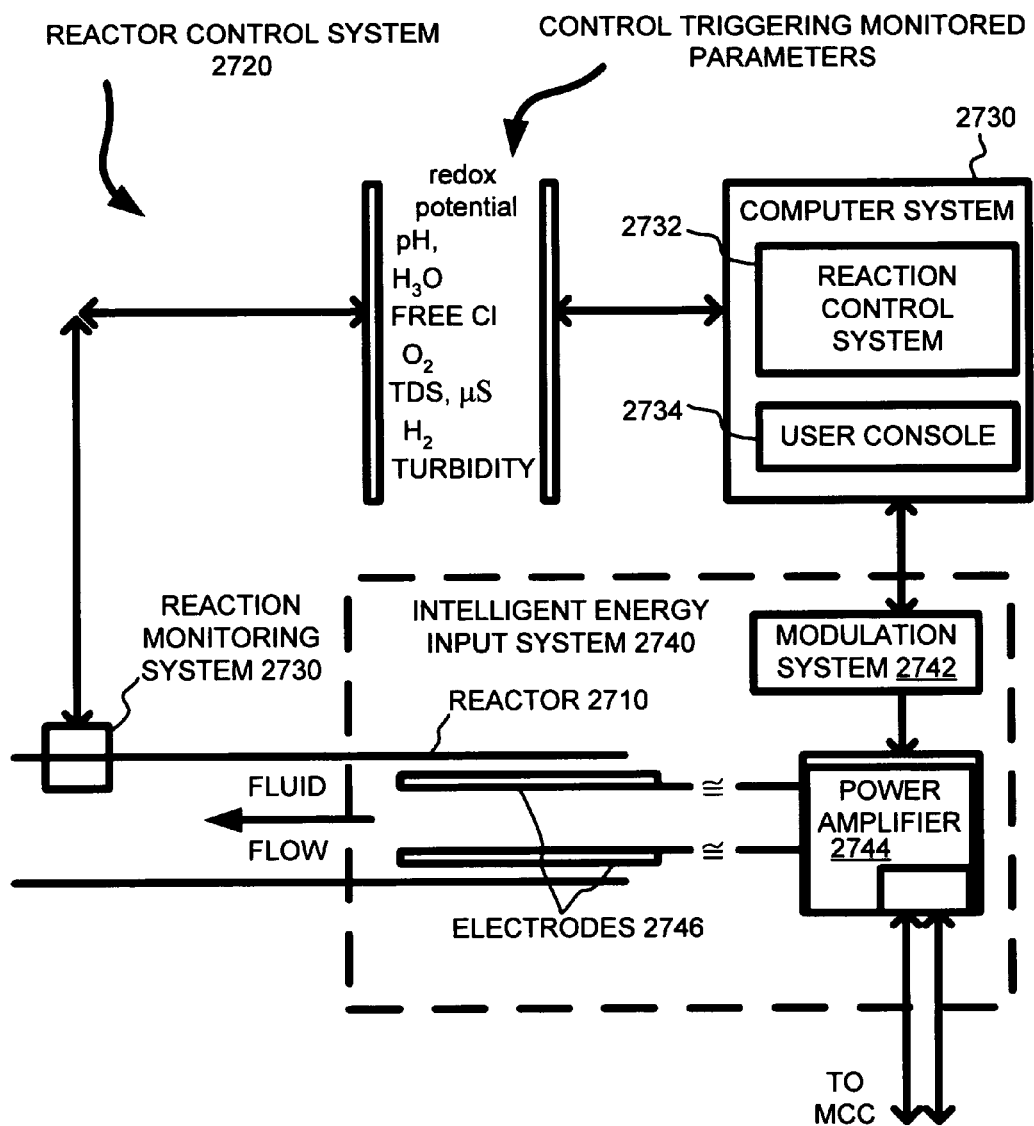
FIG. 27 shows a reactor and a reactor control system, according to embodiments of the invention.

FIG. 27 shows a reactor 2710 and a reactor control system 2720, according to embodiments of the invention. The reactor system may include one of the reactors described elsewhere herein. The reactor has electrodes 2746 and a fluid flow in which a reaction takes place. The control system includes a reaction monitoring system 2730, a computer system 2730 having a reaction control system 2732 and a user console 2734, and an intelligent energy input system 2740. The monitoring system may include conventional monitoring devices to monitor properties such as redox potential, pH, acidity, free chlorine, oxygen, total dissolved solids, hydrogen, turbidity, etc. The monitoring system may interact bi-directionally with the computer system. The computer system may receive the monitored property and apply the reaction control system to provide control signals to the intelligent energy input system. The intelligent energy input system may include a modulation system 2742 and a power amplifier 2744 to alter the energy input provided to the fluid within the reactor by the electrodes. Signals may be provided to other systems such as a master control system. In this way the reactor may be controlled according to embodiments of the invention.

Figure 28:
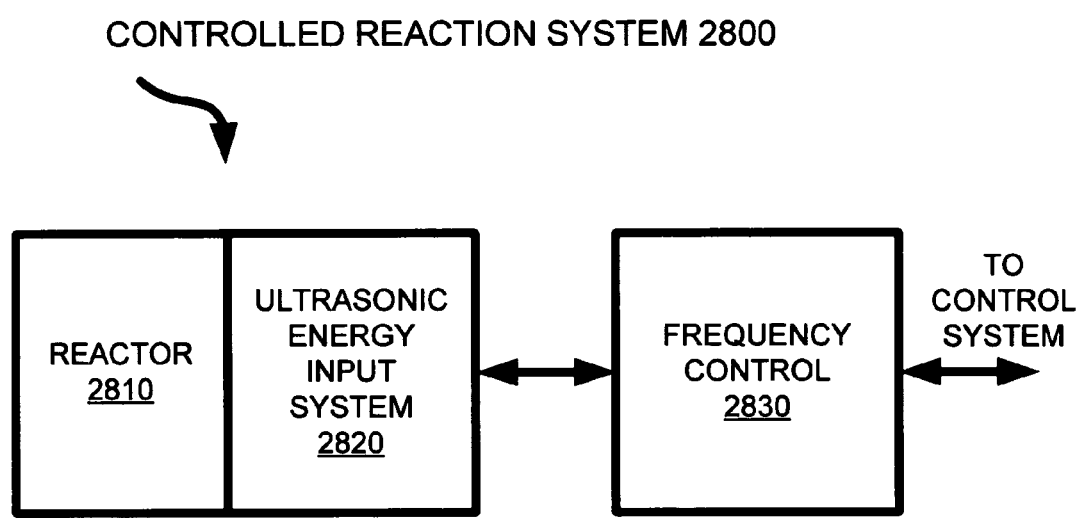
FIG. 28 shows a controlled reaction system, according to embodiments of the invention.

FIG. 28 shows a controlled reaction system 2800, according to embodiments of the invention. The system includes a reactor 2810, an ultrasonic energy input system 2820, and a frequency control 2830 coupled with a control system. The reactor system may include one of the reactors described elsewhere herein. For example, the reactor may comprise the reactor shown in FIG. 1. The control system may bi-directionally provide control signals to the frequency control which may bi-directionally provide signals to the energy input system which may modify the ultrasonic energy input into the reactor in order to control the reaction therein.

As discussed herein, a "system" or "computer system" may comprise an apparatus including hardware and/or software for processing data. The system may include, but is not limited to, a computer (e.g., portable, laptop, desktop, server, mainframe, etc.), hard copy equipment (e.g., optical disk burner, printer, plotter, fax machine, etc.), and the like.

Figure 29:
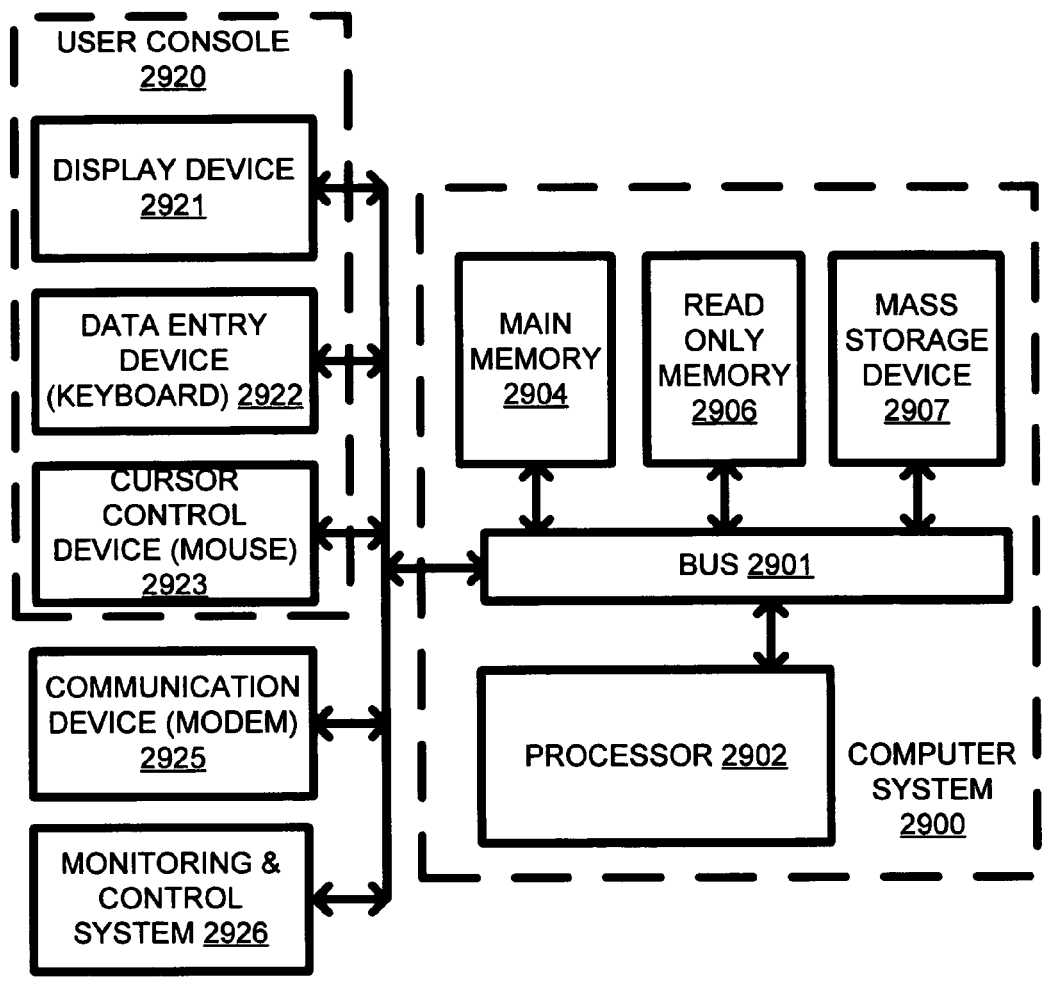
FIG. 29 shows a computer system in which embodiments of the present invention may be implemented.

A computer system 2900 representing an exemplary workstation, host, or server in which features of the present invention may be implemented will now be described with reference to FIG. 29. The computer system 2900 represents one possible computer system for implementing embodiments of the present invention, however other computer systems and variations of the computer system 2900 are also possible. The computer system 2900 comprises a bus or other communication means 2901 to communicate information, and a processing means such as processor 2902 coupled with the bus 2901 to process information. The computer system 2900 further comprises a random access memory (RAM) or other dynamic storage device 2904 (referred to as main memory), coupled with the bus 2901 to store information and instructions to be executed by the processor 2902. The main memory 2904 also may be used to store temporary variables or other intermediate information during execution of instructions by the processor 2902. In one embodiment, the main memory 2904 may be used to store the operating system, application programs, predetermined coded instructions, rule sets, data structures, and other types of data. The computer system 2900 also comprises a read only memory (ROM) and other static storage devices 2906 coupled with the bus 2901 to store static information and instructions for the processor 2902, such as the BIOS. A data storage device 2907 such as a magnetic disk, zip, or optical disc and its corresponding drive may also be coupled with the computer system 2900 to store information and instructions.

The computer system 2900 may also be coupled via the bus 2901 to a user console 2920. The console may comprise a display device 2921, such as a cathode ray tube (CRT) or liquid crystal display (LCD), to display information to an end user. The console may also comprise a data input device 2922, such as a keyboard or other alphanumeric input device including alphanumeric and other keys, coupled with the bus 2901 to communicate information and command selections to the processor 2902. Another type of user input device is a cursor control device 2923, such as a mouse, a trackball, or cursor direction keys, to communicate direction information and command selections to the processor 2902 and to control cursor movement on the display 2921.

A communication device 2925 is also coupled with the bus 2901. Depending upon the particular implementation, the communication device 2925 may include a modem, a network interface card, or other well-known interface devices, such as those used for coupling to Ethernet, token ring, or other types of physical attachment for purposes of providing a communication link to support a local or wide area network, for example. In any event, in this manner, the computer system 2900 may be coupled with a number of clients or servers via a conventional network infrastructure, such as a company's intranet, an extranet, or the Internet, for example. A reaction monitoring and control system 2926 may also be coupled with the bus to communicate reaction monitoring and control information to the processor 2902.

Embodiments of the invention are not limited to any particular computer system. Rather, embodiments may be used on any stand alone, distributed, networked, or other type of computer system. For example, embodiments may be used on one or more computers compatible with NT, Linux, Windows, Macintosh, any variation of Unix, or others.

Thus, chemical reactor systems and methods have been described. In the foregoing specification, the invention has been described with reference to specific embodiments thereof. It will, however, be evident that various modifications and changes may be made thereto without departing from the broader spirit and scope of the invention. With respect to the above description then, it is to be realized that the optimum dimensional relationships for the parts of the invention, to include variations in size, materials, shape, form, function and manner of operation, assembly and use, are deemed readily apparent to one of ordinary skill in the art, and all equivalent relationships to those illustrated in the drawings and described in the specification are intended to be encompassed by the present invention. The specification and drawings are, accordingly, to be regarded in an illustrative rather than a restrictive sense.

What is claimed is:

1. An electrochemical reactor comprising a fluid flow channel that spirals about an axis, the fluid flow channel comprising an anode, a cathode across from the anode, and a membrane disposed between the anode and the cathode, wherein the anode and the cathode spiral about the axis and the membrane has an angle that is different than 90° relative to horizontal.

2. The reactor of claim 1, wherein the anode is opposite from and parallel to the cathode.

3. The reactor of claim 1, wherein the fluid flow channel includes portions of fluid on opposite sides of the anode and the cathode from the membrane.

4. The reactor of claim 1, wherein the fluid flow channel spirals about the axis at a plurality of different spiraling diameters.

5. The reactor of claim 4, wherein the fluid flow channel, the anode, and the cathode conically spiral about the axis.

6. An electrochemical reactor comprising a fluid flow channel that spirals about an axis, the fluid flow channel comprising an anode, a cathode across from the anode, and a membrane disposed between the anode and the cathode, wherein the reactor comprises an inner housing inserted into a void of an outer housing with the membrane disposed between the housings, the inner housing having voids representing a first fluid flow channel portion, and the outer housing having voids representing a corresponding second fluid flow channel portion, the first fluid flow channel portion and the second fluid flow channel portion to combine to form the fluid flow channel when the inner housing is inserted into the void of the outer housing.

7. The reactor of claim 6, wherein one of the fluid flow channel portions comprises the anode and another comprises the cathode.

8. The reactor of claim 6, wherein the anode and the cathode spiral about the axis.

9. The reactor of claim 6, wherein the anode is opposite from and parallel to the cathode.

10. The reactor of claim 6, wherein the fluid flow channel includes portions of fluid on opposite sides of the anode and the cathode from the membrane.

11. The reactor of claim 6, wherein the fluid flow channel spirals about the axis at a plurality of different spiraling diameters.

12. The reactor of claim 11, wherein the fluid flow channel, the anode, and the cathode conically spiral about the axis.

13. An electrochemical reactor comprising a fluid flow channel that spirals about an axis, the fluid flow channel comprising an anode, a cathode across from the anode, and a membrane disposed between the anode and the cathode, wherein: (i) the anode comprises a permeable anode, and (ii) the fluid flow channel comprises a portion on an opposite side of the permeable anode as the membrane.

14. The reactor of claim 13, wherein the anode and the cathode spiral about the axis.

15. The reactor of claim 13, wherein the anode is opposite from and parallel to the cathode.

16. The reactor of claim 13, wherein the fluid flow channel spirals about the axis at a plurality of different spiraling diameters.

17. The reactor of claim 16, wherein the fluid flow channel, the anode, and the cathode conically spiral about the axis.

18. A method comprising:
adding one or more reactants to an inlet of a reactor;
flowing the one or more reactants through a spiraling fluid flow channel of the reactor, wherein said flowing comprised flowing the one or more reactants through a conically spiraling fluid flow channel including between an anode and a cathode on both sides of a membrane and in a portion on the opposite side of an electrode as the membrane;
forming one or more products from the one or more reactants by performing a chemical reaction in the spiraling fluid flow channel; and
removing the one or more products from an outlet of the reactor.

19. The method of claim 18, wherein said flowing comprises flowing the one or more reactants over a membrane that has an angle that is different than 90° relative to horizontal.

20. The method of claim 18, wherein said flowing comprises flowing the one or more reactants through a permeable anode.

21. A reactor comprising an inlet, an outlet, and a conically spiraling fluid flow channel coupled between the inlet and the outlet, wherein the reactor comprises an inner housing inserted into a void of an outer housing, the inner housing having a shape of a conical frustum and the void having a shape to accommodate the conical frustum, the inner housing having a first conically spiraling fluid flow channel portion, and the outer housing having a corresponding second conically spiraling fluid flow channel portion, the first channel portion and the second channel portion to combine to form the conically spiraling fluid flow channel when the inner housing is inserted into the void of the outer housing.

22. The reactor of claim 21, further comprising an anode in the conically spiraling fluid flow channel.

23. The reactor of claim 21, further comprising a membrane in the conically spiraling fluid flow channel.

24. The reactor of claim 23, wherein the membrane has an angle that is different than 90° relative to horizontal.

25. The reactor of claim 23, further comprising a portion of the conically spiraling fluid flow channel on an opposite side of the anode as the membrane.

* * * * *